United States Patent
Nomizo

(10) Patent No.: US 11,764,393 B2
(45) Date of Patent: Sep. 19, 2023

(54) PACK CASE, BATTERY PACK, AND METHOD FOR MANUFACTURING PACK CASE

(71) Applicant: TOYOTA JIDOSHA KABUSHIKI KAISHA, Toyota (JP)

(72) Inventor: Fumio Nomizo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 456 days.

(21) Appl. No.: 16/773,111

(22) Filed: Jan. 27, 2020

(65) Prior Publication Data

US 2020/0259139 A1 Aug. 13, 2020

(30) Foreign Application Priority Data

Feb. 8, 2019 (JP) .................................. 2019-021418

(51) Int. Cl.
| | |
|---|---|
| *H01M 10/04* | (2006.01) |
| *H01M 50/242* | (2021.01) |
| *H01M 50/233* | (2021.01) |
| *H01M 50/204* | (2021.01) |
| *B29C 45/14* | (2006.01) |
| *H01M 50/224* | (2021.01) |

(Continued)

(52) U.S. Cl.
CPC ... *H01M 10/0481* (2013.01); *B29C 45/14467* (2013.01); *H01M 50/204* (2021.01); *H01M 50/209* (2021.01); *H01M 50/224* (2021.01); *H01M 50/233* (2021.01); *H01M 50/242* (2021.01); *B29K 2705/00* (2013.01); *B29L 2031/7146* (2013.01); *H01M 2220/20* (2013.01)

(58) Field of Classification Search
CPC .. H01M 50/20; H01M 50/204; H01M 50/233; H01M 50/242; H01M 10/0481
See application file for complete search history.

(56) References Cited

U.S. PATENT DOCUMENTS 6,109,380 A * 8/2000 Veenstra ............... H01M 50/20
180/68.5
2011/0143179 A1 6/2011 Nakamori
(Continued)

FOREIGN PATENT DOCUMENTS

| CN | 103370811 A | 10/2013 |
|---|---|---|
| CN | 105636776 A | 6/2016 |

(Continued)

OTHER PUBLICATIONS

Fumio Nomizo, Office Action Issued to U.S. Appl. No. 17/656,577 dated Mar. 29, 2023.

*Primary Examiner* — Jonathan G Jelsma
(74) *Attorney, Agent, or Firm* — Dickinson Wright, PLLC

(57) ABSTRACT

A pack case includes: a first wall pressing a battery stack toward a second side in a stacking direction; and a second wall pressing the battery stack toward a first side in the stacking direction. At least one of the first wall and the second wall is a panel structure wall including a first metal plate, a second metal plate located outward of the first metal plate in the stacking direction and faces the first metal plate, and an interposed member interposed between and fixed to the first metal plate and the second metal plate. The interposed member has a lower density than a metal forming the first metal plate and the second metal plate.

6 Claims, 16 Drawing Sheets

(51) Int. Cl.
*H01M 50/209* (2021.01)
*B29L 31/00* (2006.01)
*B29K 705/00* (2006.01)

(56) References Cited

U.S. PATENT DOCUMENTS

| | | | |
|---|---|---|---|
| 2012/0103714 A1* | 5/2012 | Choi | B62D 29/041 |
| | | | 180/68.5 |
| 2012/0202093 A1 | 8/2012 | Heo | |
| 2012/0214023 A1 | 8/2012 | Koh | |
| 2014/0038029 A1 | 2/2014 | Thurmeier et al. | |
| 2016/0207236 A1 | 7/2016 | Tsubota et al. | |
| 2019/0267591 A1* | 8/2019 | Park | H01M 10/0481 |
| 2020/0106065 A1* | 4/2020 | Ito | H01M 50/227 |
| 2020/0243809 A1 | 7/2020 | Nordstrand et al. | |

FOREIGN PATENT DOCUMENTS

| | | |
|---|---|---|
| JP | 2005-339929 A | 12/2005 |
| JP | 2011-124101 A | 6/2011 |
| JP | 2018056098 A | 4/2018 |
| JP | 2018125182 A | 8/2018 |

\* cited by examiner

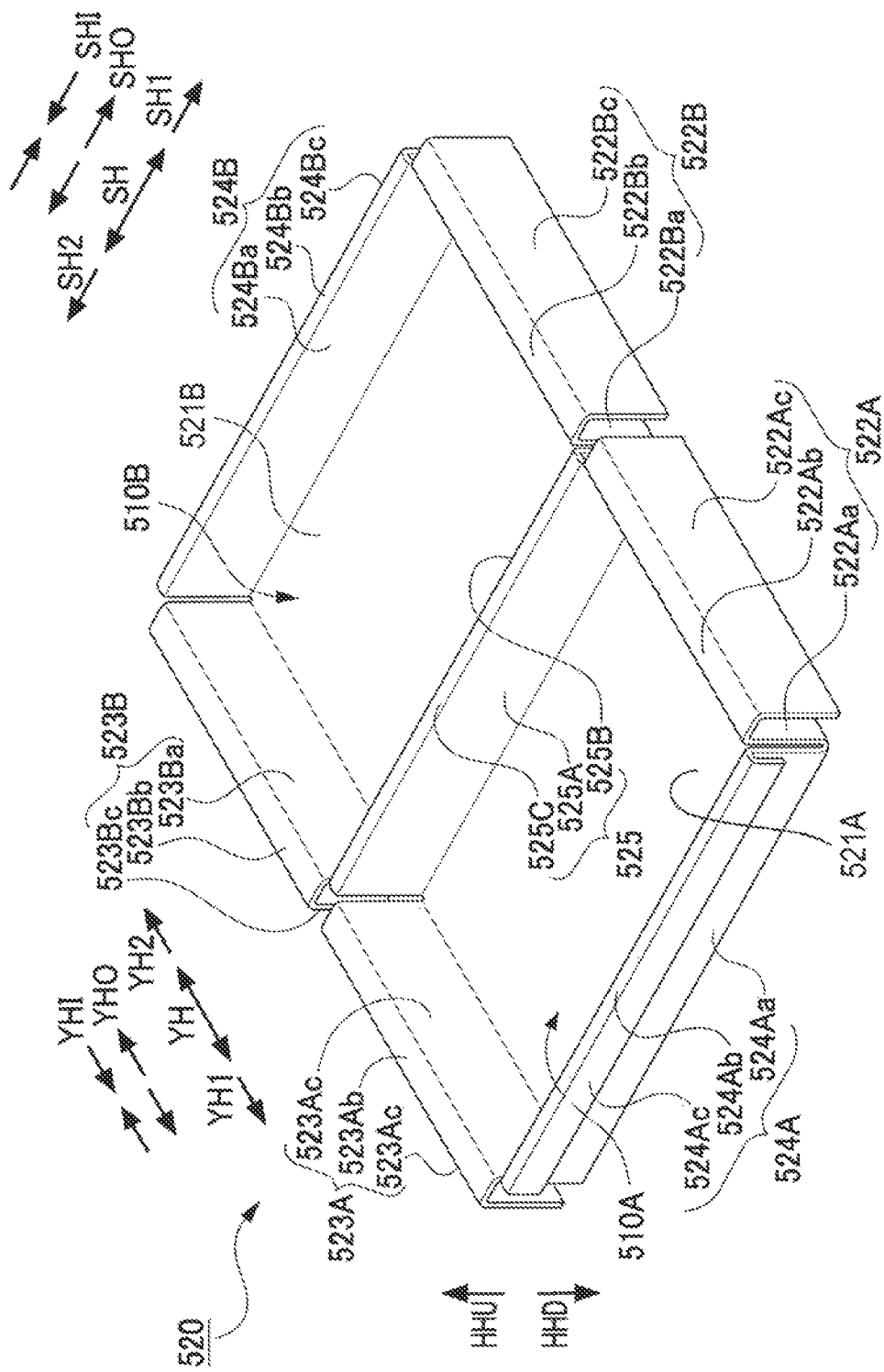

PACK CASE, BATTERY PACK, AND METHOD FOR MANUFACTURING PACK CASE

INCORPORATION BY REFERENCE

The disclosure of Japanese Patent Application No. 2019-021418 filed on Feb. 8, 2019 including the specification, drawings and abstract is incorporated herein by reference in its entirety.

BACKGROUND

1. Technical Field

The present disclosure relates to a pack case that accommodates a battery stack in which a plurality of batteries are stacked, a battery pack in which the pack case houses the battery stack, and a method for manufacturing a pack case.

2. Description of Related Art

As a battery pack accommodating a plurality of batteries, a battery pack may be required in which the batteries are restrained by applying in a stacking direction a predetermined compression force to a battery stack, in which the batteries are stacked. Examples of the battery pack of this type includes a battery pack in which bolts are provided to extend between end plates arranged at both ends of a battery stack in a stacking direction and fastened with nuts, and a compression force is applied to the battery stack (see, Japanese Unexamined Patent Application Publication No. 2005-339929 (JP 2005-339929 A)).

SUMMARY

A battery pack is also conceivable that is formed by inserting, in a pack case formed by aluminum die casting or the like to have a bottomed rectangular box shape, a battery stack compressed with a compression force larger than a desired compression force, and then, loosening the compression so that the battery stack is accommodated in the battery pack in a compressed state with the desired compression force using rigidity of the pack case.

However, when the battery stack is restrained by using the bolts and the nuts, the size of the battery pack increases, and the weight of the battery pack as a whole increases due to the weights of the end plates, the bolts, and the like. On the other hand, the battery pack including the aluminum die-cast pack case accommodating the battery stack can be made relatively light. However, in order to maintain an appropriate compression force, the rigidity of each part must be increased by increasing a thickness of walls of the pack case. Thus, the pack case itself tends to be heavy.

The present disclosure provides a pack case that is lightweight and can accommodate a battery stack while applying a compression force to the battery stack, a battery pack including the pack case accommodating the battery stack, and a method for manufacturing the pack case.

A first aspect of the present disclosure relates to a pack case. The pack case accommodates a battery stack in which a plurality of batteries are stacked in a stacking direction, and compresses and restrains the battery stack in the stacking direction. The pack case includes a first wall that is located on a first side of the accommodated battery stack in the stacking direction, contacts a first end of the battery stack, and presses the battery stack toward a second side in the stacking direction, and a second wall that is located on the second side of the accommodated battery stack in the stacking direction, contacts a second end of the battery stack, and presses the battery stack toward the first side in the stacking direction. At least one of the first wall and the second wall is a panel structure wall including a first metal plate, a second metal plate, and an interposed member. The second metal plate is located outward of the first metal plate in the stacking direction and faces the first metal plate. The interposed member is interposed between the first metal plate and the second metal plate, is fixed to the first metal plate and the second metal plate, and has a density lower than that of a metal forming the first metal plate and the second metal plate.

In the above pack case that accommodates the battery stack and compresses and restrains the battery stack in the stacking direction, at least one of the first wall and the second wall that press the battery stack in the stacking direction is the panel structure wall that includes the first metal plate, the second metal plate, and the interposed member interposed between and fixed to the first metal plate and the second metal plate, and that has a so-called sandwich panel structure. Thus, the first wall or the second wall that is the panel structure wall has higher flexural rigidity and higher torsional rigidity compared to the case where the wall is formed of only the first metal plate or the case where the wall is formed of only the first metal plate and the interposed member fixed thereto. Therefore, it is possible to suppress deformation of the panel structure wall (first wall or second wall) due to a reaction force with respect to a compression force that compresses the battery stack in the stacking direction, and thus, to suppress reduction of the compression force that compresses the battery stack in the stacking direction. Moreover, the interposed member interposed between the first metal plate and the second metal plate has the density lower than that of the metal forming the first metal plate and the second metal plate. Therefore, it is possible to make the panel structure wall lightweight compared to the case where a solid metal plate having the same thickness as the panel structure wall is used instead of the sandwich panel structure. Thus, it is also possible to make the pack case lightweight.

The pack case may have a rectangular frame shape surrounding the battery stack from four sides, or may have a bottomed rectangular frame shape (bottomed rectangular box shape) having a bottom, for example. The pack case may have a U shape (shape of a rectangle with one open side) having no lateral side wall and having a bottom in addition to the first wall and the second wall. The first metal plate and the second metal plate forming the panel structure wall may be separate metal plates, or may be provided by bending one metal plate into a U-shape.

As a material for the first metal plate and the second metal plate forming the panel structure wall (first wall or second wall), an appropriate metal plate may be used. Example of the material include a steel plate, a galvanized steel plate, a nickel plated steel plate, a stainless steel plate, an aluminum plate, etc.

Further, as the interposed member, a resin material made from thermoplastic resin such as polyamide, thermosetting resin such as epoxy, fiber reinforced plastic such as glass fiber reinforced polyamide, or the like can be used. In this case, besides using a solid interposed member made from resin, the interposed member may be provided with a lightening portion such as a hole (lightening hole), in order to reduce a weight of the panel structure wall and further a weight of the pack case. Further, a foamed resin material made of urethane foam, foamed polyamide, etc., a honeycomb material for a core material, in which a metal such as aluminum or stainless steel, or resin such as polypropylene or aramid is formed in a honeycomb shape, can also be used for the interposed member. The interposed member may be formed of a single member extending over the entire panel structure wall. Alternatively, the interposed member may be formed of a plurality of members. For example, in the interposed member, a portion close to the four corners of the pack case having a rectangular frame shape and a central portion may be formed of different members.

For fixing the interposed member to the first metal plate and the second metal plate of the panel structure wall, a primer is applied to the first metal plate and the second metal plate, to which the interposed member is fixed. Alternatively, after the first metal plate and the second metal plate are subjected to surface roughing such as chemical etching or laser processing, resin may be injected by injection molding between the first metal plate and the second metal plate to form the interposed member and bond the interposed member to the first metal plate and the second metal plate together.

In the first aspect, the panel structure wall may include a first metal plate portion that is the first metal plate, a second metal plate portion that is the second metal plate, and a connecting portion connecting the first metal plate portion and the second metal plate portion. The first metal plate portion, the second metal plate portion and the connecting portion are formed by bending one metal plate into a U-shape.

In the pack case, the first metal plate portion and the second metal plate portion that are the first metal plate and the second metal plate are provided by bending one metal plate into a U-shape. Therefore, it is possible to reduce the number of parts forming the pack case and to provide an inexpensive pack case. In addition, compared to the case where the first metal plate and the second metal plate are separate members, the first metal plate portion and the second metal plate portion are connected via the connecting portion (the first metal plate portion, the second metal plate portion, and the connecting portion connecting the first metal plate portion and the second metal plate portion are formed of one metal plate). Therefore, it is possible to further improve the flexural rigidity and the torsional rigidity of the panel structure wall (first wall, second wall).

As a U-shaped bending form in the connecting portion of the metal plate, the connecting portion may have a semicircular (rounded) bending form. The connecting portion may have a bending form having the shape of a rectangle with one open side (form in which opposite ends of the flat connecting portion are bent at an angle of 90 degrees to extend in the same direction). This is because the flexural rigidity and the torsional rigidity of the panel structure wall (first wall, second wall) can be further improved by connecting the respective parts by bending at an angle of 90 degrees.

In the first aspect, the pack case may include a third wall and a fourth wall that are each located on an outer side of the accommodated battery stack in a lateral direction orthogonal to the stacking direction, that form, together with the first wall and the second wall, a rectangular frame surrounding the battery stack from four sides, and that connects the first wall and the second wall. The third wall and the fourth wall may each include a lateral metal plate extending in the stacking direction, and the lateral metal plate may be connected to the first metal plate and the second metal plate via a corner connecting resin portion made from resin.

In the pack case, each of the third wall and the fourth wall includes the lateral metal plate extending in the stacking direction, and the lateral metal plate is connected to the panel structure wall (first wall, second wall) via the corner connecting resin portion. Therefore, part of the reaction force with respect to a compression force applied by the panel structure wall (first wall, second wall) to the battery stack can be transmitted to the third wall and the fourth wall each including the lateral metal plate via the corner connecting resin portions to be carried by the third wall and the fourth wall as a tensile force in the stacking direction.

The pack case may be configured such that the lateral metal plate is not directly connected to the first metal plate or the second metal plate forming the panel structure wall. That is, the pack case may be configured such that the lateral metal plate and the first and second metal plates are separate members or the lateral metal plate and the first metal plate are formed by individually bending at respective fold lines orthogonal to each other and raising upright from a bottom plate to which the lateral metal plate and the first plate are connected. Alternatively, the pack case may be configured such that one metal plate is bent so that the lateral metal plate is directly connected (continuous) to the first metal plate or the second metal plate forming the panel structure wall.

In the pack case according to the first aspect, the lateral metal plate may have an extending portion extending outward of the first metal plate of the panel structure wall in the stacking direction, in which the panel structure wall is the first wall or the second wall. The extending portion may include a panel engagement portion that is located outward of the first metal plate in the stacking direction and inward of a lateral edge of the first metal plate in the lateral direction, and that engages with the first metal plate via the corner connecting resin portion.

In the pack case, the panel engagement portion provided in the extending portion of the lateral metal plate is engaged with the first metal plate via the corner connecting resin portion. Thus, the lateral side wall including the lateral metal plate and the panel structure wall (first wall, second wall) can be more firmly connected, which enables the pack case to have higher rigidity and higher strength.

Examples of the panel engagement portion include a bulging portion that is formed by bulging a part of the extending portion of the lateral metal plate in a plate thickness direction (inward in the lateral direction) so that the bulging portion is located inward of a lateral edge of the first metal plate in the lateral direction and engages with the first metal plate via the corner connecting resin portion. The examples of the panel engagement portion further include a bending protruding portion that is formed by protruding a part of the extending portion so that the bending protruding portion engages with the first metal plate via the corner connecting resin portion.

In the pack case according to the above aspect, at least one of the third wall and the fourth wall may be a panel structure lateral side wall including the lateral metal plate, the second lateral metal plate, and a lateral interposed member. The second lateral metal plate may extend in the stacking direction and may be located outward or inward of the lateral metal plate in the lateral direction so as to face the lateral metal plate. The lateral interposed member may be interposed between the lateral metal plate and the second lateral metal plate, may be fixed to the lateral metal plate and the second lateral metal plate, and may have a density lower than that of a metal forming the lateral metal plate and the second lateral metal plate.

In the pack case, at least one of the third wall and the fourth wall is the panel structure lateral side wall having the sandwich panel structure. The panel structure lateral side wall has high flexural rigidity and torsional rigidity, compared to the case of using a single lateral metal plate as the lateral side wall or using only the lateral metal plate and the lateral interposed member as the lateral side wall. Therefore, the rigidity and the strength of the rectangular frame-shaped pack case can be further improved.

Here, the lateral metal plate and the second lateral metal plate may be separate metal plates, or may be formed by bending one metal plate into a U-shape for use. In addition, the sandwich panel structure composed of the lateral metal plate, the second lateral metal plate, and the lateral interposed member may be employed only in a part of the lateral side wall in the height direction that is orthogonal to the stacking direction and the lateral direction.

In the pack case according to the first aspect, each of the third wall and the fourth wall may be the panel structure lateral side wall.

In the pack case, each of the third wall and the fourth wall has the sandwich panel structure. Therefore, it is possible to provide the lightweight pack case having even higher rigidity.

In the pack case according to the first aspect, each of the first wall and the second wall may be the panel structure wall.

In the pack case, each of the first wall and the second wall has the sandwich panel structure. Therefore, it is possible to provide the lightweight pack case having even higher rigidity.

A second aspect of the present disclosure relates to a battery pack. The battery pack includes the pack case according to the first aspect and the battery stack accommodated in the pack case so as to be compressed and restrained in the stacking direction.

In the battery pack, at least one of the first wall and the second wall of the pack case compressing and restraining the battery stack is the panel structure wall having the sandwich panel structure with high flexural rigidity and high torsional rigidity. Therefore, it is possible to provide the battery pack that is lightweight but does not easily deform, at the first wall or the second wall that is the panel structure wall, with a reaction force to the compression force applied to the battery stack in order to compress and restrain the battery stack, while suppressing the reduction of the compression force due to deformation of the first wall or the second wall.

A third aspect of the present disclosure relates to a method for manufacturing a pack case. The pack case accommodates a battery stack in which a plurality of batteries are stacked in a stacking direction, and compresses and restrains the battery stack in the stacking direction. The pack case includes a first wall and a second wall. The first wall is located on a first side of the accommodated battery stack in the stacking direction, contacts a first end of the battery stack, and presses the battery stack toward a second side in the stacking direction. The second wall is located on the second side of the accommodated battery stack in the stacking direction, contacts a second end of the battery stack, and presses the battery stack toward the first side in the stacking direction. At least one of the first wall and the second wall is a panel structure wall including a first metal plate, a second metal plate, and an interposed member. The second metal plate is located outward of the first metal plate in the stacking direction and faces the first metal plate. The interposed member is interposed between the first metal plate and the second metal plate, is fixed to the first metal plate and the second metal plate, and has a density lower than that of a metal forming the first metal plate and the second metal plate. The method includes: setting the first metal plate and the second metal plate in a mold; and performing an injection molding for forming the panel structure wall by charging resin between the set first metal plate and the set second metal plate and molding the interposed member.

In the above method, the interposed member is formed by injection molding. Therefore, it is possible to easily manufacture the pack case including the panel structure wall (first wall, second wall). In the injection molding, besides using a solid interposed member made from resin, the interposed member may be provided with a lightening portion such as a lightening hole, in order to reduce the weight of the panel structure wall and further the weight of the pack case.

The method according to the third aspect further includes, prior to the setting, bending one metal plate into a U-shape to form a first metal plate portion that is the first metal plate, a second metal plate portion that is the second metal plate, and a connecting portion connecting the first metal plate portion and the second metal plate portion.

In the method, in the bending, the first metal plate portion that is the first metal plate and the second metal plate portion that is the second metal plate are formed by bending one metal plate into a U-shape. Thus, it is possible to reduce the number of parts of the panel structure walls, and therefore, reduce the number of parts of the pack case. Accordingly, it is possible to reduce man-hours required in the setting and the like, which facilitates the manufacture of the pack case. Further, the first metal plate portion and the second metal plate portion are connected. Therefore, it is possible to further improve the flexural rigidity and the torsional rigidity of the panel structure wall (first wall, second wall).

In the method according to the third aspect, the pack case may include a third wall and a fourth wall that are each located on an outer side of the accommodated battery stack in a lateral direction orthogonal to the stacking direction, that form, together with the first wall and the second wall, a rectangular frame surrounding the battery stack from four sides, and that connects the first wall and the second wall. The third wall and the fourth wall each may include a lateral metal plate extending in the stacking direction. The lateral metal plate may be connected to the first metal plate and the second metal plate via a corner connecting resin portion made from resin. In the setting, the lateral metal plate forming the third wall and the lateral metal plate forming the fourth wall may also be set in the mold. In the injection molding, the panel structure wall may formed and the corner connecting resin portion may be formed.

In the above method, the panel structure wall is formed and the corner connecting resin portion is formed in the injection molding, which further facilitates the manufacture of the pack case.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 26 is a perspective view of a metal case member used for the pack case according to the second embodiment.

DETAILED DESCRIPTION OF EMBODIMENTS

First Embodiment

Figure 1:
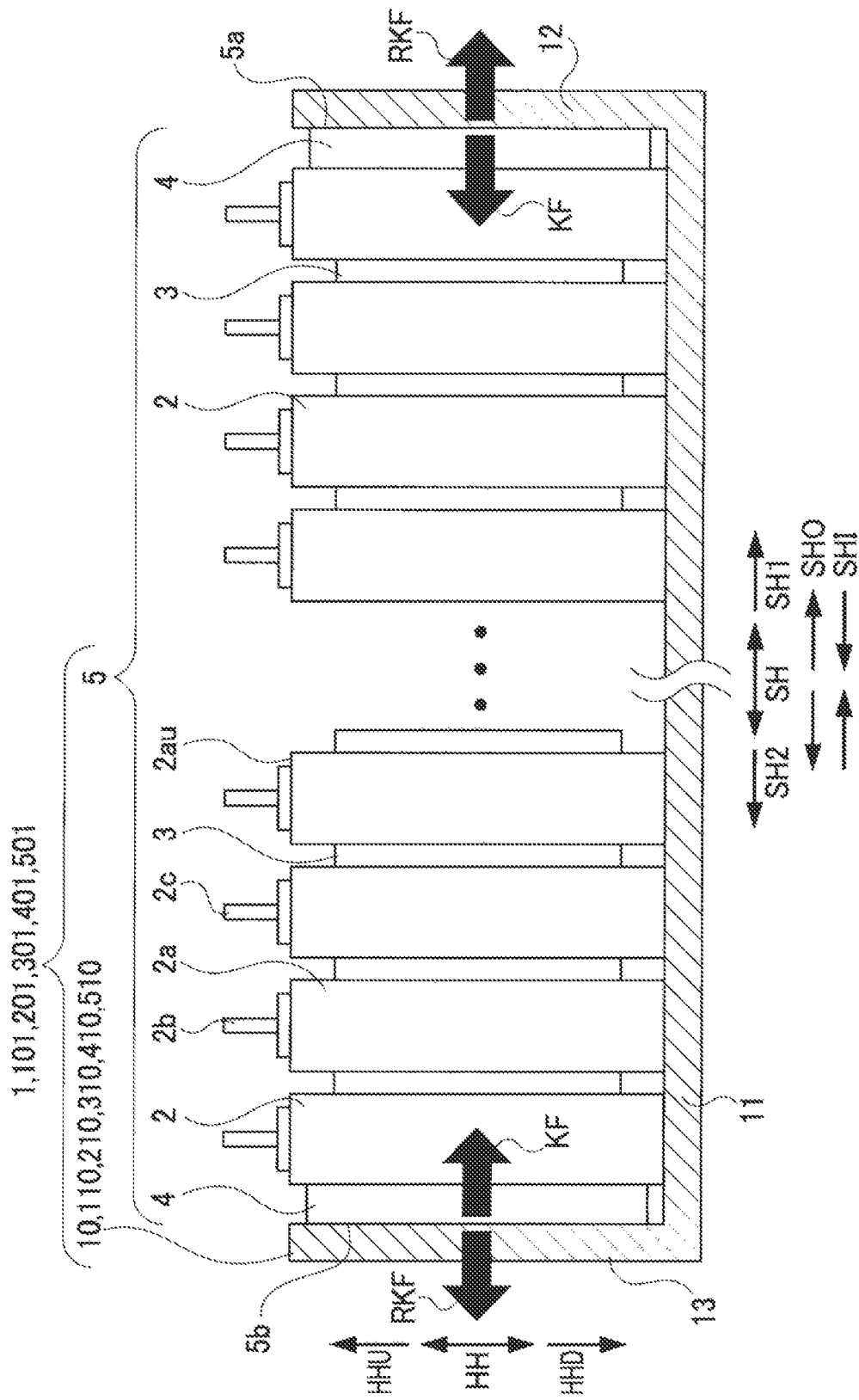
FIG. 1 is an explanatory diagram illustrating a battery pack according to a first embodiment.

Hereinafter, a first embodiment of the present disclosure will be described with reference to the drawings. FIG. 1 shows a battery pack 1 according to the first embodiment. The battery pack 1 is an in-vehicle battery pack that is mounted on a vehicle such as a hybrid car, a plug-in hybrid car, and an electric vehicle. The battery pack 1 includes: a battery stack 5 in which batteries (cells) 2, spacers 3 and end plates 4 are stacked in a stacking direction SH (right-left direction in FIG. 1); and a pack case 10 accommodating the battery stack 5 while compressing the battery stack 5 in the stacking direction SH with a compression force KF.

Among these, the battery stack 5 includes the rectangular (cuboid) batteries 2 and the rectangular plate-shaped spacers 3 stacked alternately, as well as the rectangular plate-shaped metal end plates 4 arranged at the opposite ends in the stacking direction SH.

The batteries 2 are sealed rectangular lithium ion secondary batteries. The batteries 2 are connected in series via a bus bar (not shown). Each battery 2 contains electrodes (not shown) together with a non-aqueous electrolyte solution in a battery case 2a made of metal (aluminum in the first embodiment) and having a cuboid box shape. A positive terminal member 2b and a negative terminal member 2c are fixed to an upper surface 2au of the battery case 2a while being insulated from the battery case 2a. The terminal members 2b, 2c are connected to and electrically connected to a positive electrode plate or a negative electrode plate of an electrode (not shown) in the battery case 2a, and pass through the upper surface 2au of the battery case 2a to the upper part of the battery.

The spacers 3 are rectangular plate-shaped members made from insulating resin. Each spacer 3 is interposed between two batteries 2 adjacent to each other in the stacking direction SH to insulate the battery cases 2a of the batteries 2 and forms a heat dissipation path for each battery 2. The end plates 4 are rectangular plate-shaped members made of metal (aluminum in the first embodiment), and disposed on the outer side of the batteries 2 at the opposite ends in the stacking direction SH.

Figure 2:
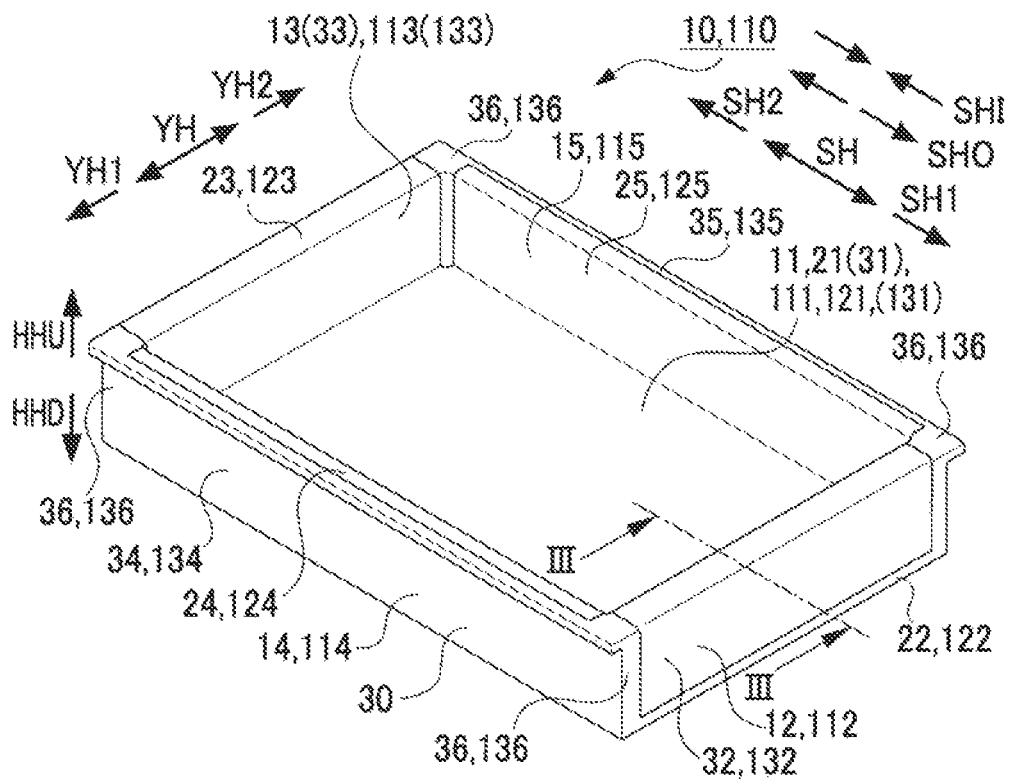
FIG. 2 is a perspective view of a pack case according to the first embodiment and a first modification.

The pack case 10 (see also FIG. 2) has the shape of a bottomed rectangular tube opening only on an upper side HHU in a height direction HH that is orthogonal to the stacking direction SH. The pack case 10 includes a rectangular plate-shaped bottom wall 11 and four walls 12 to 15 extending upright from four side edges of the bottom wall 11 toward the upper side HHU to form a rectangular frame shape. Among these, a first side wall 12 is located on a first side SH1 (right side in FIG. 1, lower right side in FIG. 2) in the stacking direction SH, and a second side wall 13 is located on a second side SH2 (left side in FIG. 1, upper left side in FIG. 2) in the stacking direction SH and faces the first side wall 12. A third side wall 14 and a fourth side wall extend in the stacking direction SH so as to be orthogonal to a lateral direction YH orthogonal to the stacking direction SH and the height direction HH and so as to face each other, as shown in FIG. 2. The four walls 12 to 15 are connected to each other by corner connecting resin portions 36 (described later) located at the four corners.

Figure 4:
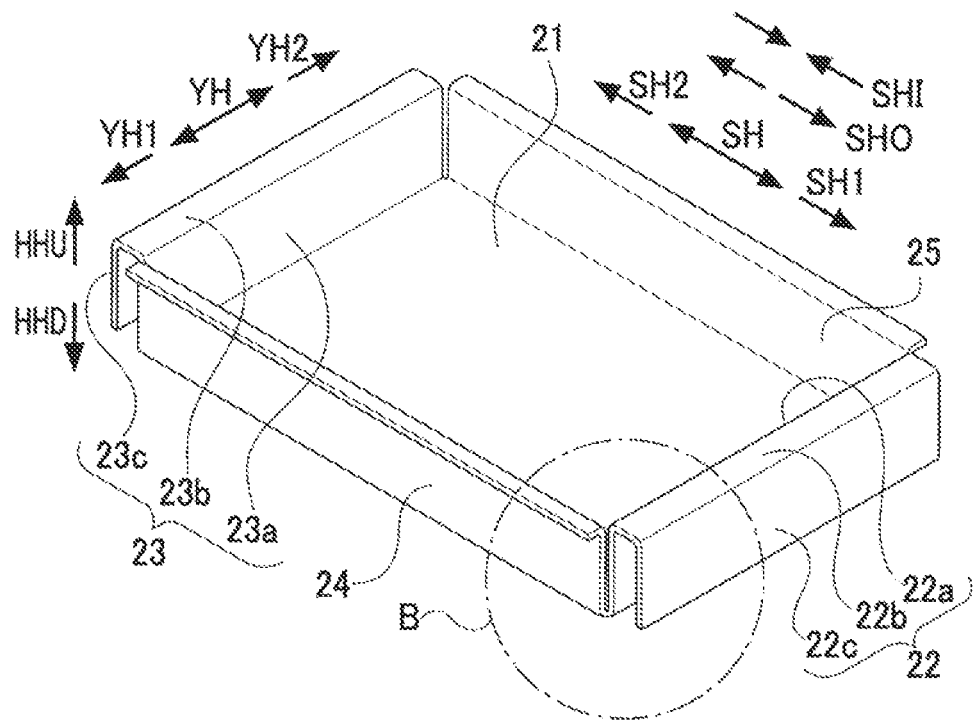
FIG. 4 is a perspective view of a metal case member used for the pack case according to the first embodiment and the first modification.
Figure 5:
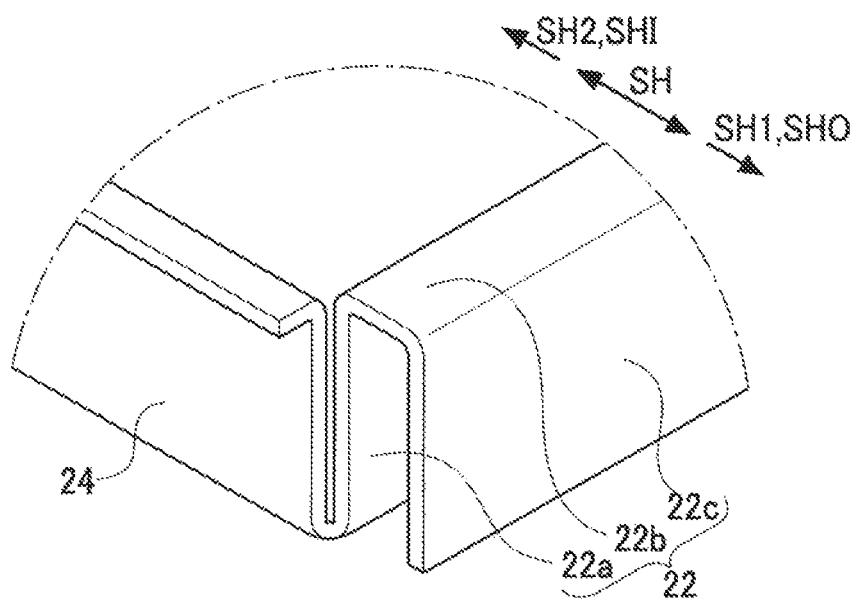
FIG. 5 is an enlarged perspective view of a corner (a part B in FIG. 4) of the metal case member used for the pack case according to the first embodiment and the first modification.

The pack case 10 includes a metal case member 20 shown in FIGS. 4 and 5 and a resin case member 30 provided so as to cover the metal case member 20 from outside. The resin case member 30 is formed by resin injection molding, and is fixed to and integrated with the metal case member 20.

Figure 6:
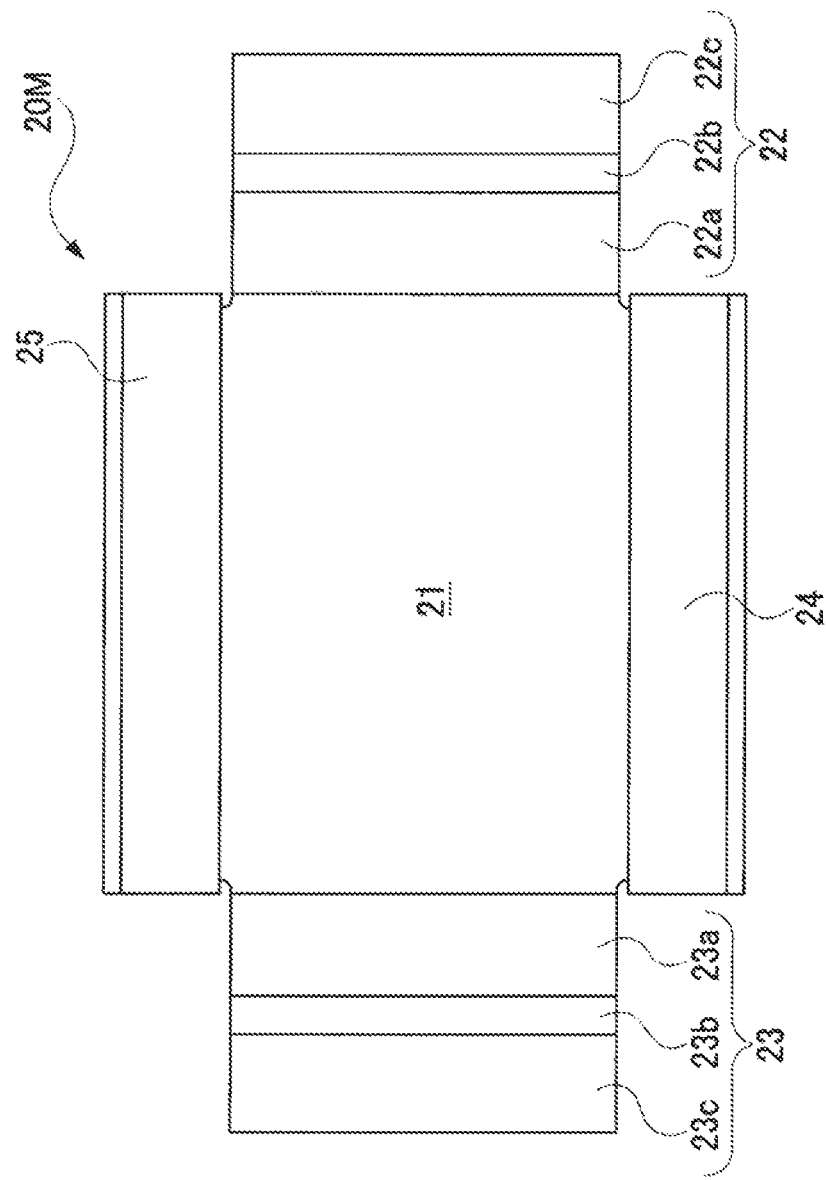
FIG. 6 is a developed view of the metal case member used for the pack case according to the first embodiment and the first modification.

The metal case member 20 (see FIGS. 4 and 5) is formed by bending a flat metal plate 20M made of a galvanized steel plate shown in FIG. 6, and includes a rectangular bottom metal plate portion 21 and rectangular side wall metal plate portions 22 to 25 extending upright from the four side edges of the bottom metal plate portion 21 to the upper side HHU. A first side wall metal plate portion 22 is located on the first side SH1 (lower right side in FIG. 4) in the stacking direction SH, and a second side wall metal plate portion 23 is located on the second side SH2 (upper left side in FIG. 4) in the stacking direction SH and laces the first side wall metal plate portion 22. A third side wall metal plate portion 24 and a fourth side wall metal plate portion 25 extend in the stacking direction SH so as to be orthogonal to the lateral direction YH and to face each other, as shown in FIG. 4. The four side wall metal plate portions 22 to 25 are not directly connected to each other but are connected via the bottom metal plate portion 21 as shown in FIG. 4.

As shown in FIG. 5, the first side wall metal plate portion 22 is formed by bending one metal plate 20M into a U shape (shape of a rectangle with one open side), and has an inner metal plate portion 22a, a connecting portion 22b, and an outer metal plate portion 22c. The inner metal plate portion 22a is formed by bending the metal plate 20M at an angle of 90 degrees so as to be connected to the bottom metal plate portion 21 and extend upright to the upper side HHU. The connecting portion 22b has a plate shape and is formed by further bending the metal plate 20M at an angle of 90 degrees so as to be connected to the inner metal plate portion 22a and extend to the first side SH1 in the stacking direction SH. The outer metal plate portion 22c is formed by further bending the metal plate 20M at an angle of 90 degrees so as to be connected to the connecting portion 22b and extend to a lower side HHD while facing the inner metal plate portion 22a. The connecting portion 22b connects the inner metal plate portion 22a and the outer metal plate portion 22c.

Similarly to the first side wall metal plate portion 22, the second side wall metal plate portion 23 has an inner metal plate portion 23a, a connecting portion 23b, and an outer metal plate portion 23c. The inner metal plate portion 23a is formed by bending the metal plate 20M at an angle of 90 degrees so as to be connected to the bottom metal plate portion 21 and extend upright to the upper side HHU. The connecting portion 23b has a plate shape and is formed by further bending the metal plate 20M at an angle of 90 degrees so as to be connected to the inner metal plate portion 23a and extend to the second side SH2 in the stacking direction SH. The outer metal plate portion 23c is formed by further bending the metal plate 20M at an angle of 90 degrees so as to be connected to the connecting portion 23b and extend to the lower side HHD while facing the inner metal plate portion 23a. The connecting portion 23b connects the inner metal plate portion 23a and the outer metal plate portion 23c. Further, the third side wall metal plate portion 24 and the fourth side wall metal plate portion 25 have their respective end portions bent at an angle of 90 degrees in order to increase their rigidity.

Figure 3:
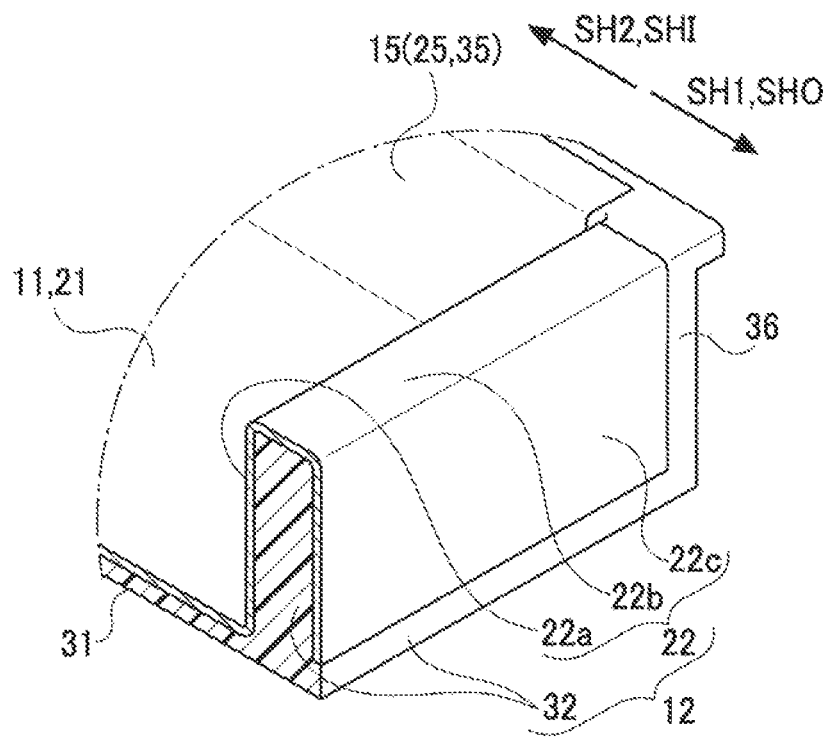
FIG. 3 is an enlarged sectional perspective view of the pack case according to the first embodiment, taken along line III-III in FIG. 2.

The resin case member 30 is made from glass fiber reinforced polyamide and is formed in a bottomed rectangular tube shape so as to cover the metal case member from outside, as shown in FIGS. 2 to 4. That is, in the bottom wall 11, a bottom plate portion 31 is formed on the lower side HHD of the bottom metal plate portion 21 so as to be fixed to the bottom metal plate portion 21. In the third side wall 14, a third side wall resin portion 34 is formed on a first side YH1 of the third side wall metal plate portion 24 in the lateral direction YH so as to be fixed to the third side wall metal plate portion 24. Similarly in the fourth side wall 15, a fourth side wall resin portion 35 is provided on a second side YH2 of the fourth side wall metal plate portion 25 in the lateral direction YH so as to be fixed to the fourth side wall metal plate portion 25.

In the first side wall 12, a first side wall resin portion 32 is formed outward SHO of the inner metal plate portion 22a of the first side wall metal plate portion 22 in the stacking direction SH (on the first side SH1 in the stacking direction SH) and inward SH1 of the outer metal plate portion 22c of the first side wall metal plate portion 22 in the stacking direction SH (on a second side SH2 in the stacking direction SH) i.e., between the inner metal plate portion 22a and the outer metal plate portion 22c, so as to be fixed to the inner metal plate portion 22a and the outer metal plate portion 22c. In the second side wall 13, a second side wall resin portion 33 is formed outward SHO of the inner metal plate portion 23a of the second side wall metal plate portion 23 in the stacking direction SH (on the second side SH2 in the stacking direction SH) and inward SH1 of the outer metal plate portion 23c of the second side wall metal plate portion 23 in the stacking direction SH (on the first side SH1 in the stacking direction SH), i.e., between the inner metal plate portion 23a and the outer metal plate portion 23c, so as to be fixed to the inner metal plate portion 23a and the outer metal plate portion 23c.

The bottom plate portion 31 and the four side wall resin portions 32 to 35 are connected to each other by the corner connecting resin portions 36 located at the four corners. Thus, as described above, the four walls 12 to 15 including the four side wall resin portions 32 to 35 are connected to each other by the corner connecting resin portions 36.

In the first embodiment, the above-mentioned portions of the metal case member 20 and the above-mentioned portions of the resin case member 30 are fixed to each other by applying a primer (for example, VESTAMELT Hylink (registered trademark) manufactured by Daicel-Evonik, Ltd., etc.) to the portions of the metal case member 20, which serve as fixing surfaces to which the portions of the resin case member 30 are fixed, followed by injection molding such that resin adheres to the fixing surfaces of the metal case member 20.

As described above, the first side wall 12 has a so-called sandwich panel structure, in which the first side wall resin portion 32 is interposed between and fixed to the inner metal plate portion 22a and the outer metal plate portion 22c. Thus, compared to a case of using, instead of the first side wall 12, a wall including only the inner metal plate portion 22a or a wall including only the inner metal plate portion 22a and the first side wall resin portion 32 fixed to the inner metal plate portion 22a, flexural rigidity and torsional rigidity of the first side wall 12 are high. Thus, it is possible to suppress deformation of the first side wall 12 due to a reaction force RKF to the compression force KF that compresses the battery stack 5 in the stacking direction SN thereby lowering the compression force KF that presses the battery stack 5. In addition, the first side wall resin portion 32 (glass fiber reinforced polyamide, density: 1.35 g/cm) interposed between the inner metal plate portion 22a and the outer metal plate portion 22c has a density lower than that of a metal (galvanized steel plate, density: 7.8 g/cm$^3$) forming the inner metal plate portion 22a and the outer metal plate portion 22c. Therefore, the first side wall 12 can be made lightweight compared to the case of using a solid metal plate having the same thickness instead of the sandwich panel structure. Thus, the pack case can be also made lightweight. Note that the second side wall 13 having the same sandwich panel structure provides the same effects as those of the first side wall 12 described above, and therefore description thereof will be omitted.

In the pack case 10, the first side wall metal plate portion 22 that is a part of one metal plate 20M is bent into a U shape (shape of a rectangle with one open side) to provide the inner metal plate portion 22a and the outer metal plate portion 22c functioning as a first metal plate and a second metal plate, respectively, to form the first side wall 12. Therefore, it is possible to form the pack case 10 with a small number of parts and make the pack case 10 inexpensive. In contrast to the case where the first metal plate and the second metal plate are formed as separate parts, the inner metal plate portion 22a and the outer metal plate portion 22c are connected via the connecting portion 22b. That is, a part of one metal plate 20M forms the inner metal plate portion 22a, the outer metal plate portion 22c, and the connecting portion 22b connecting the inner metal plate portion 22a and the outer metal plate portion 22c. Therefore, it is possible to further improve the flexural rigidity and the torsional rigidity of the first side wall 12. In particular, in the first side wall 12 of the first embodiment, the inner metal plate portion 22a, the connecting portion 22b, and the outer metal plate portion 22c are connected by bending at an angle of 90 degrees. Thus, it is possible to further improve the flexural rigidity and the torsional rigidity of the first side wall 12. Note that the second side wall 13 having the same sandwich panel structure provides the same effects as those of the first side wall 12 described above, and therefore description thereof will be omitted.

Moreover, in the pack case 10, both the first side wall 12 and the second side wall 13 located on the first side SH1 and the second side SH2, respectively, in the stacking direction SH have the sandwich panel structure. Therefore, it is possible to provide the lightweight pack case 10 having even higher rigidity.

Further, in the battery pack 1 of the first embodiment, which includes the pack case 10, the first side wall 12 and the second side wall 13 of the pack case 10 compressing and restraining the battery stack 5 are panel structure walls each having the sandwich panel structure with high flexural rigidity and high torsional rigidity. Therefore, it is possible to provide the battery pack 1 that is lightweight but does not easily deform with the reaction force RKF to the compression force KF applied to the battery stack 5 in order to compress and restrain the battery stack 5, while suppressing the reduction of the compression force KF due to deformation.

In the first embodiment, unlike the first side wall 12 and the second side wall 13, each of the third side wall 14 and the fourth side wall 15 does not have the sandwich panel structure. However, the sandwich panel structure may be adopted that is similar to those of the first side wall 12 and the second side wall 13, or similar to those of third side walls 514A, 514B and a fourth side wall 515 in a pack case 510 of a second embodiment to be described later. In such a pack case, each of the third side wall and the fourth side wall has the sandwich panel structure. Therefore, it is possible to provide the lightweight pack case having even higher rigidity.

Figure 7:
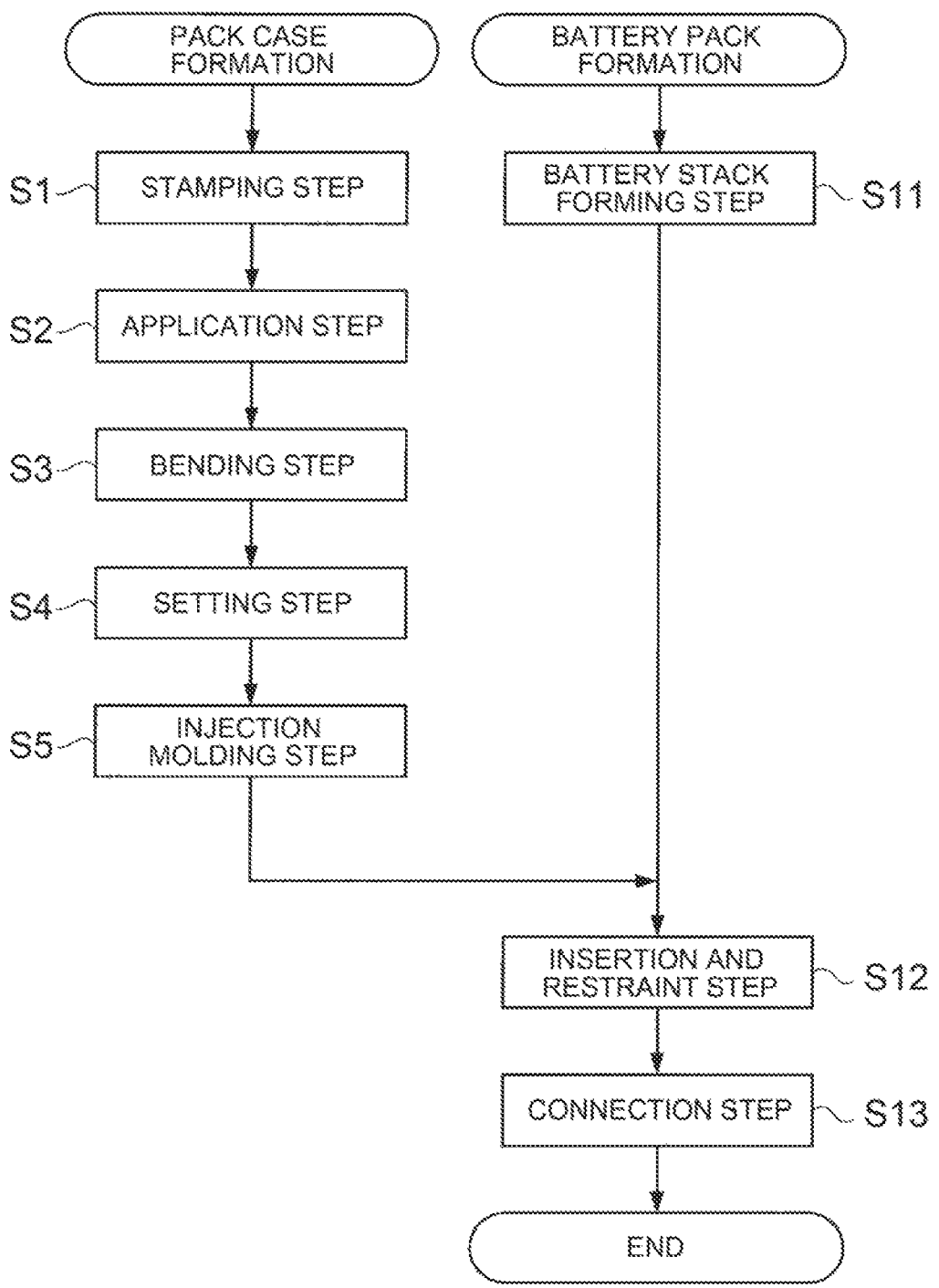
FIG. 7 is a flowchart showing processes of manufacturing the pack case and the battery pack according to the first and second embodiments and the first to fourth modifications.

The pack case 10 of the first embodiment is manufactured by the following procedure (see FIG. 7). First, in a stamping step S1, the metal plate 20M is formed by stamping from a hoop-shaped metal plate (not shown). Next, in an application step S2, a primer is applied to a portion of the metal plate 20M, which serves as a fixing surface that is fixed to resin, and is dried. Next, in a bending step S3, the metal case member 20 is formed by bending the metal plate 20M. The metal plate 20M may be obtained by stamping in the stamping step, after the application step in which the primer is applied to the metal plate that has not been subjected to the stamping.

Next, in a setting step S4, the metal case member 20 is set at a predetermined position in a mold (not shown) provided in an injection molding apparatus (not shown). Subsequently, in an injection molding step S5, the injection molding apparatus is operated to inject resin and the resin case member 30 is molded so as to be fixed to the metal case member 20. Thus, the pack case 10 is completed.

In the method for manufacturing the pack case 10 described above, the first side wall resin portion 32 and the second side wall resin portion 33 are formed by injection molding. Therefore, it is possible to easily manufacture the pack case 10 having the first side wall 12 and the second side wall 13 that are the panel structure walls.

Further, in the bending step S3, a part of one metal plate 20M is bent into a U shape (shape of a rectangle with one open side) to form the inner metal plate portion 22a, the outer metal plate portion 22c, and the connecting portion 22b of the first side wall metal plate portion 22. The same applies to the second side wall metal plate portion 23. Thus, it is possible to reduce the number of parts of the first side wall metal plate portion 22 and the second side wall metal plate portion 23 that are the panel structure walls, and therefore, to reduce the number of parts of the pack case 10. Accordingly, it is possible to reduce man-hours required in the subsequent setting step S4 and the like, which facilitates the manufacture of the pack case 10. In addition, the inner metal plate portion 22a and the outer metal plate portion 22c (the inner metal plate portion 23a and the outer metal plate portion 23c) are connected. Therefore, it is possible to further improve the flexural rigidity and the torsional rigidity of the first side wall 12 and the second side wall 13 that are the panel structure walls.

In addition, in the setting step S4, the metal case member 20 is set in the mold, whereby the third side wall metal plate portion 24 and the fourth side wall metal plate portion 25 that function as lateral side metal plates can be set in the mold. In the injection molding step S5, the first side wall 12 and the second side wall 13 that are the panel structure walls are formed, and the corner connecting resin portion 36 is formed at each corner. Thus, in this manufacturing method, the pack case 10 can be manufactured more easily.

Next, the manufacture of the battery pack 1 will be described (see FIGS. 1 and 7). First, in a battery stack forming step S11, the battery stack 5 is formed. That is, the batteries 2 and the spacers 3 that have been separately manufactured are alternately arranged to be stacked, and the end plates 4 are arranged outward SHO of the outermost batteries 2 in the stacking direction SH (the outermost battery 2 on the first side SH1 in the stacking direction SH and the outermost battery 2 on the second side SH2 in the stacking direction SH). Thus, the battery stack 5 is formed.

Next, in an insertion and restraint step S12, the battery stack 5 is compressed in the stacking direction SH with a compression force larger than the compression force KF, which is applied by a compression tool (not shown), the battery stack 5 is inserted into the pack case 10 with battery stack 5 compressed in length (dimension in the stacking direction SH), and then, the compression force of the compression tool is released. Then, the length of the battery stack 5 slightly increases, and the battery stack 5 is restrained by the pack case 10 with the compression force KF. Thereafter, the compression tool is removed from the battery stack 5.

Thereafter, in a connection step S13, the positive terminal member 2b and the negative terminal member 2c of each battery 2 are connected to each other in a predetermined connection pattern (for example, in series) using a bus bar (not shown) or the like. Thus, the battery pack 1 is completed. Pack cases 110, 210, 310, 410, 510 and battery packs 101, 201, 301, 401, 501 according to first to fourth modifications and the second embodiment described later are also manufactured by the same manufacturing method.

First Modification

Next, the pack case 110 according to the first modification will be described with reference to FIGS. 2, 8, and 9. The pack case 110 according to the first modification has the same appearance as the pack case 10 of the first embodiment (see FIG. 2), and includes the metal case member 20 that is the same as that of the first embodiment (see FIGS. 4 and 5).

However, in the pack case 10 of the first embodiment, the first side wall resin portion 32 of the first side wall 12 that is the panel structure wall and the second side wall resin portion 33 of the second side wall 13 that is the panel structure wall are formed as solid resin members (see FIG. 3).

Figure 8:
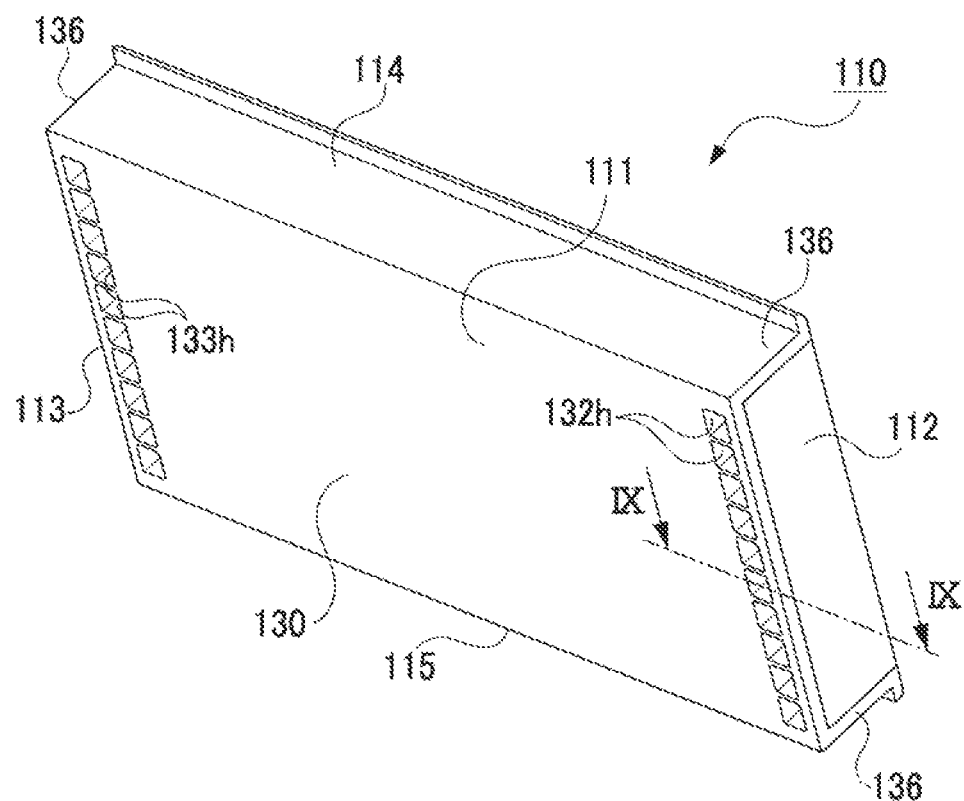
FIG. 8 is a perspective view of the pack case according to the first modification, as viewed from a bottom side.
Figure 9:
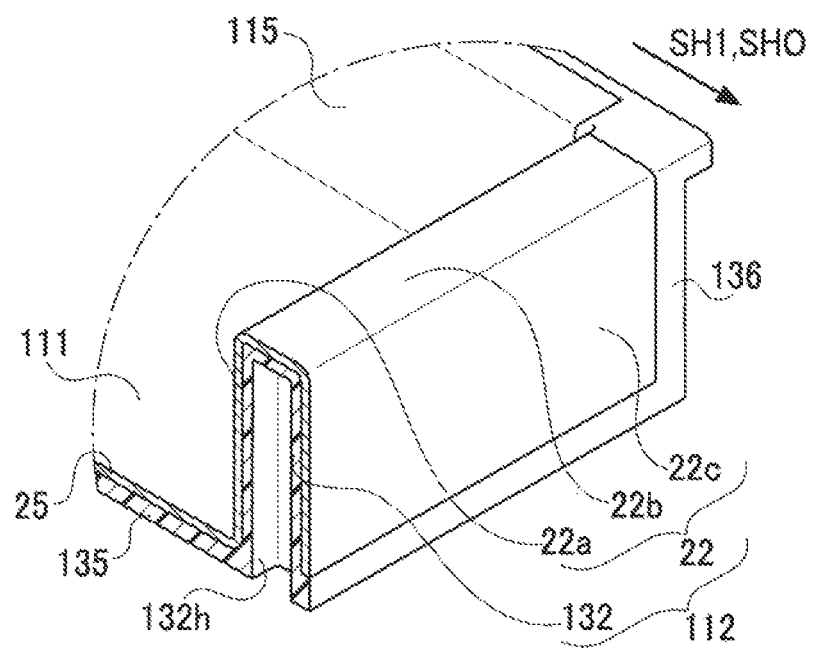
FIG. 9 is an enlarged sectional perspective view of the pack case according to the first modification, taken along line IX-IX in FIG. 8.
Figure 10:
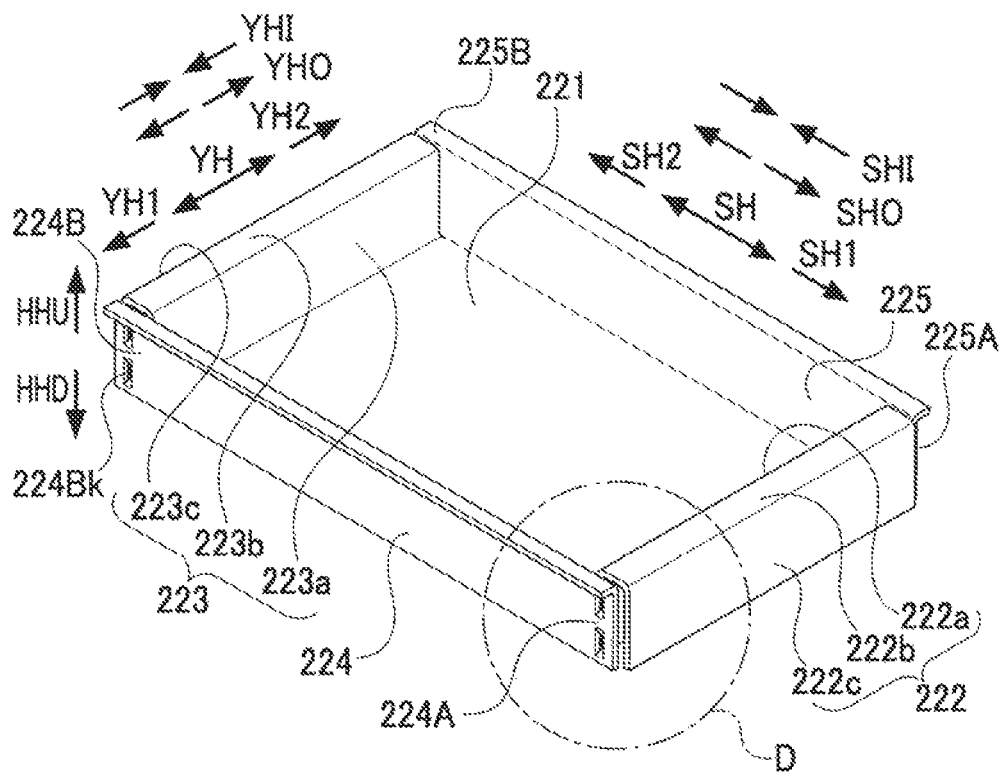
FIG. 10 is a perspective view of a metal case member used for the pack case according to the second modification.

In contrast, in the pack case 110 of the first modification, each of a first side wall resin portion 132 of a first side wall 112 and a second side wall resin portion 133 of a second side wall 113 has a number of lightening portions 132h, 133h that are substantially rectangular columnar-shaped holes and arranged side by side in the lateral direction YH (see FIGS. 8 and 9).

Thus, the first side wall 112 has the inner metal plate portion 22a, the outer metal plate portion 22c, and the first side wall resin portion 132 interposed between and fixed to the inner metal plate portion 22a and the outer metal plate portion 22c, and is the panel structure wall having the sandwich panel structure. In addition, since the first side wall resin portion 132 has the lightening portions 132h, it is possible to reduce the weight of the first side wall resin portion 132 by the weight of the lightening portions 132h, compared to the first side wall resin portion 32 of the first embodiment. Therefore, it is possible to reduce the weight of the first side wall 112 and further, reduce the weight of the pack case 110. The same applies to the second side wall 113 having the lightening portions 133h.

When the first side wall resin portion 132 and the second side wall resin portion 133 are provided with the lightening portions 132h, 133b, the form and the amount of the lightening portions 132h, 133h to be provided may be determined, considering a merit of weight reduction of the first side wall 112 and the second side wall 113 and the degree of degradation of the flexural rigidity and the torsional rigidity. Further, in forming the pack case 110 of the first modification by injection molding, the first side wall resin portion 132 and the second side wall resin portion 133 may be provided with the lightening portions 132h. 133h using pins or the like.

Second Modification

Next, the pack case 210 according to the second modification will be described with reference to FIGS. 10 to 15. The pack case 210 according to the second modification and a metal case member 220 included in the pack case 210 have substantially the same appearances as the pack case 10 and the metal case member 20, respectively, of the first embodiment (see FIGS. 2, 4 and 5).

However, in the pack case 10 of the first embodiment, the first side wall 12 and the second side wall 13 are connected with the third side wall 14 and the fourth side wall IS at the four corners of the bottom wall 11 with only the corner connecting resin portions 36 made from resin. Therefore, when the battery stack 5 is inserted into the pack case 10 and the compression force KF is applied to the battery stack 5 from the first side wall 12 and the second side wall 13, the reaction force RKF to the compression force KF is applied to the first side wall 12 and the second side wall 13 (see FIG. 1). The reaction force RKF is further transmitted to the third side wall 14 and the fourth side wall 15 in addition to the bottom wall 11, and large stresses are also applied to portions that connect the first and second side walls 12, 13 and the third and fourth side walls 14, 15 (corner connecting resin portions 36). Thus, with only the corner connecting resin portions 36 made from resin, creep or cracking is likely to occur, and it is difficult to maintain the compression force KF.

Figure 11:
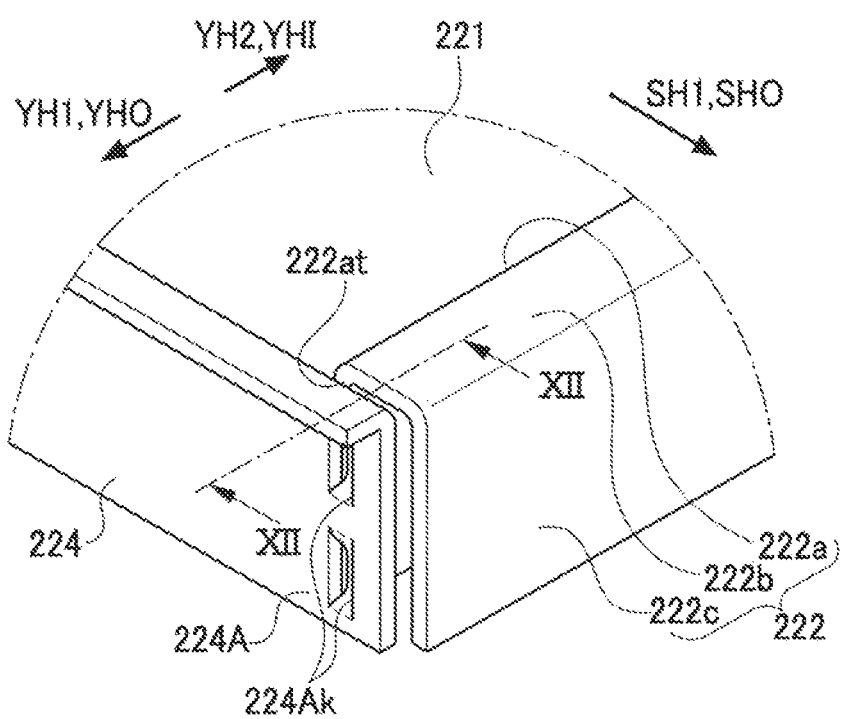
FIG. 11 is an enlarged perspective view of a corner (a part D in FIG. 10) of the metal case member used for the pack case according to the second modification.
Figure 12:
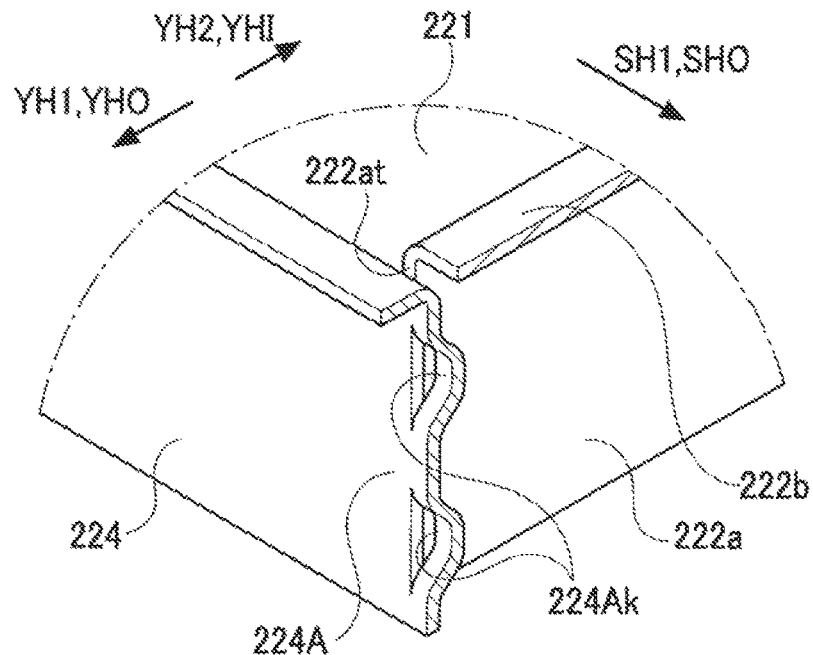
FIG. 12 is an enlarged sectional perspective view of the corner of the metal case member used for the pack case according to the second modification, taken along line XII-XII in FIG. 11.
Figure 13:
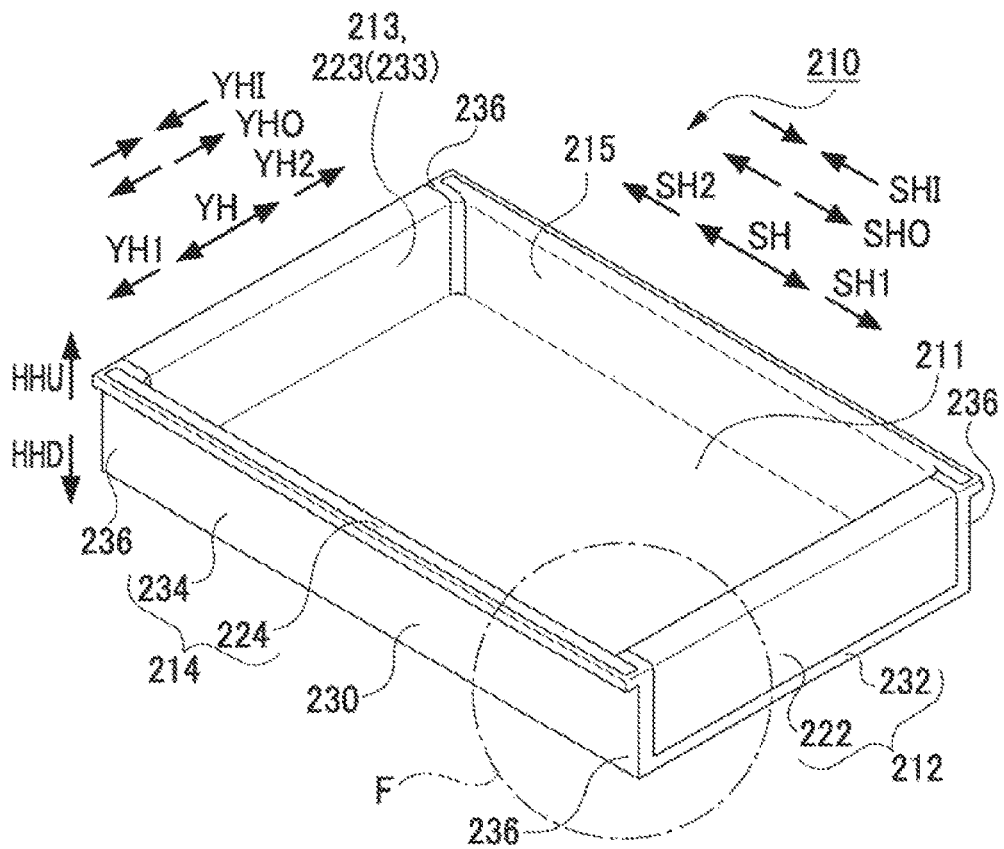
FIG. 13 is a perspective view of the pack case according to the second modification.
Figure 14:
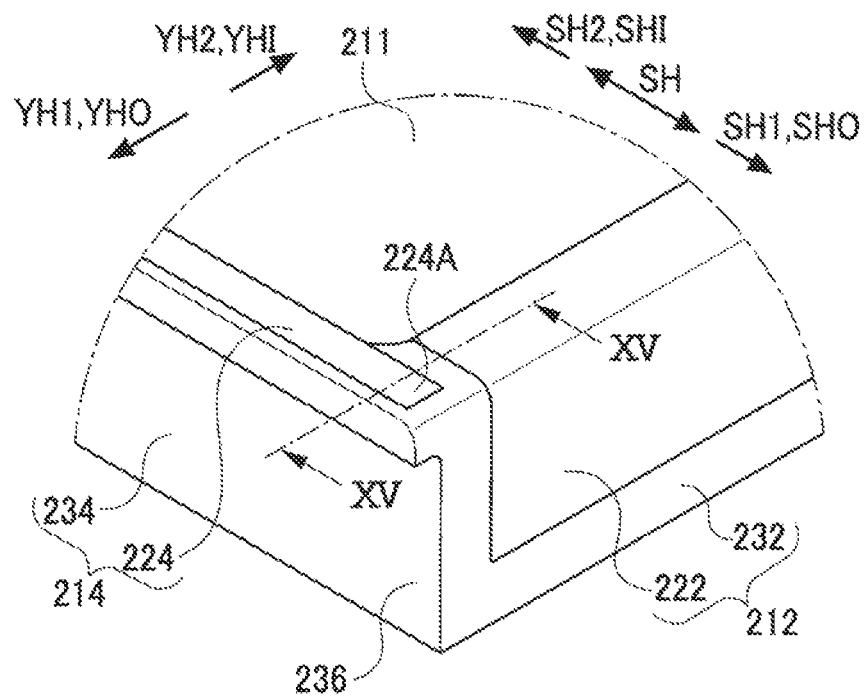
FIG. 14 is an enlarged perspective view of a corner (a part F in FIG. 13) of the pack case according to the second modification.
Figure 15:
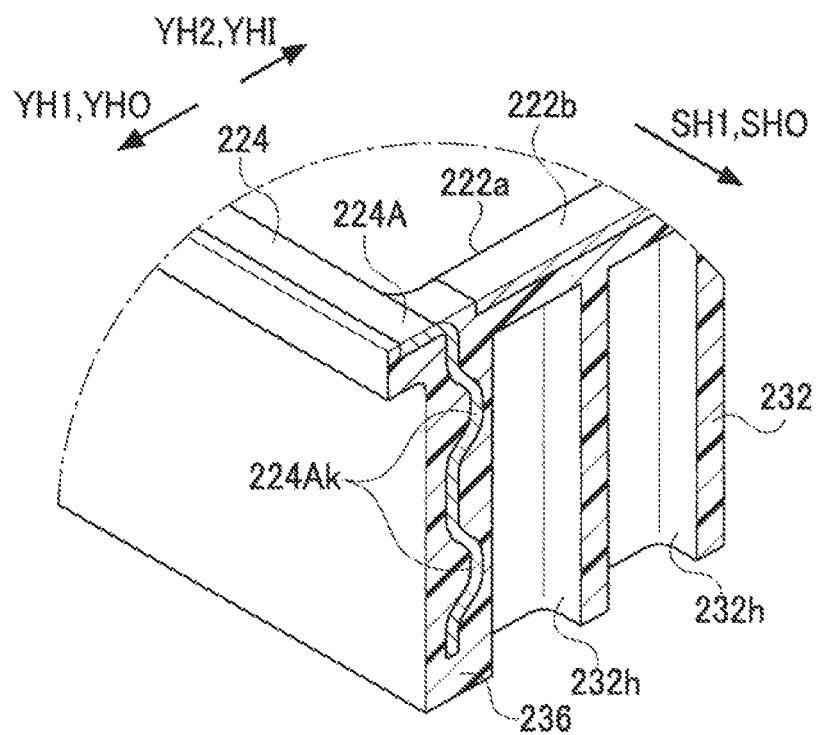
FIG. 15 is an enlarged sectional perspective view of the corner of the pack case according to the second modification, taken along line XV-XV in FIG. 14.
Figure 16:
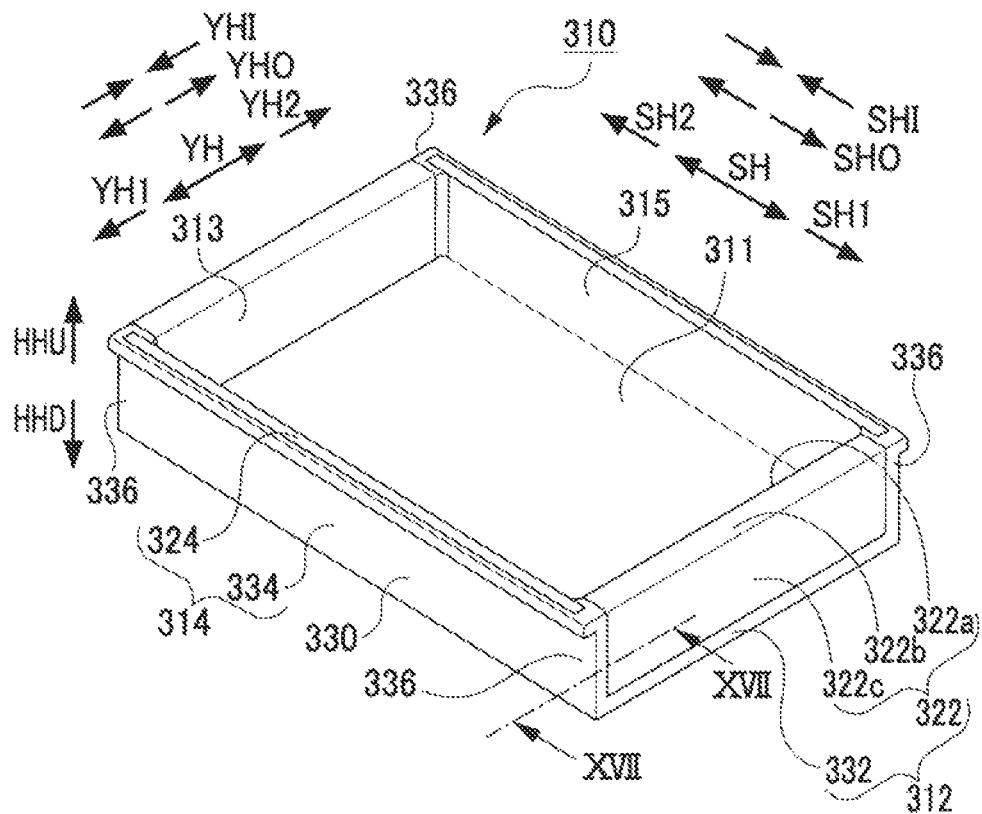
FIG. 16 is a perspective view of the pack case according to the third modification.

In contrast, as can be easily understood from FIGS. 11, 12, and 15, in the pack case 210 of the second modification, connection between first and second side walls 212, 213, and third and fourth side walls 214, 215 is improved.

Specifically, a third side wall metal plate portion 224 of the metal case member 220 has an extending portion 224A extending further outward SHO in the stacking direction SH (more toward the first side SH1 in the stacking direction SH, lower right side in FIGS. 11 and 12) than an inner metal plate portion 222a of the first side wall 212. The extending portion 224A has panel engagement portions 224Ak that are located outward SHO of the inner metal plate portion 222a in the stacking direction SH (on the first side SH1 in the stacking direction SH) and inward YH1 of an edge 222at of the inner metal plate portion 222a in the lateral direction YH (on the second side YH2 in the lateral direction YH, upper right side in FIGS. 11 and 12) and that engage with the inner metal plate portion 222a via a corner connecting resin portion 236.

In the second modification, the panel engagement portions 224Ak are two bulging portions each formed by making parallel cuts extending in the height direction HH in the extending portion 224A and bulging a portion between the cuts inward YH1 in the lateral direction YH (on the second side YH2 in the lateral direction YH, upper right side in FIGS. 11 and 12).

Further, in the metal case member 220 of the pack case 210 (see FIG. 10) according to the second modification, panel engagement portions are formed at the other three corners. That is, an extending portion 224B of the third side wall metal plate portion 224 is also provided with panel engagement portions 224Bk that are bulging portions similar to the panel engagement portions 224Ak. In addition, extending portions 225A, 225B of a fourth side wall metal plate portion 225 are also provided with panel engagement portions (not shown) formed of bulging portions similar to the panel engaging portions 224Ak.

Thus, in the pack case 210 of the second modification, the panel engagement portions 224Ak etc. provided in the extending portions 224A, 224B, 225A, 225B of the third side wall metal plate portion 224 and the fourth side wall metal plate portion 225 are engaged with the inner metal plate portions 222a, 223a via the corner connecting resin portions 236. Thus, the third side wall 214 and the fourth side wall 215 including the third side wall metal plate portion 224 and the fourth side wall metal plate portion 225 can be more firmly connected with the first side wall 212 and the second side wall 213 that are the panel structure walls, which enables the pack case 210 to have higher rigidity and higher strength.

As shown in FIG. 15, in the pack case 210 of the second modification, a first side wall resin portion 232 of the first side wall 212 is provided with lightening portions 232h as in the first modification. Therefore, it is possible to reduce the weight of the first side wall 212, and further, to reduce the weight of the pack case 210. Although not shown, a second side wall resin portion of the second side wall 213 is similarly provided with lightening portions.

Third Modification

Next, a pack case 310 according to a third modification will be described with reference to FIGS. 16 to 19. The pack case 310 according to the third modification and the metal case member 320 included therein also have substantially the same appearances as the pack case 10 and the metal case member 20 (see FIGS. 2, 4, and 5) of the first embodiment.

However, in the pack case 10 of the first embodiment, the first side wall 12 and the second side wall 13 are connected with the third side wall 14 and the fourth side wall 15 at the four corners of the bottom wall 11 with only the corner connecting resin portions 36 made from resin.

Figure 17:
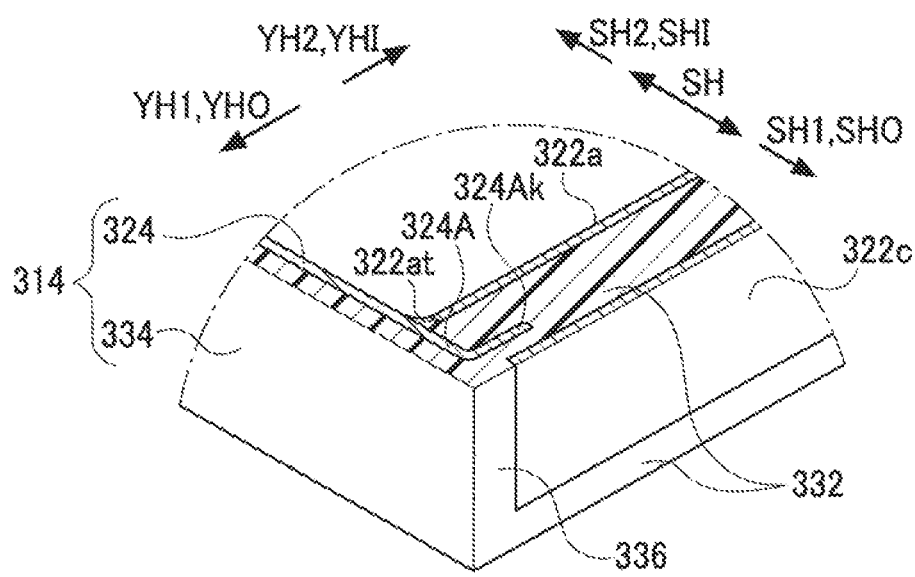
FIG. 17 is an enlarged sectional perspective view of a corner of the pack case according to the third modification, taken along line XVII-XVII in FIG. 16.
Figure 18:
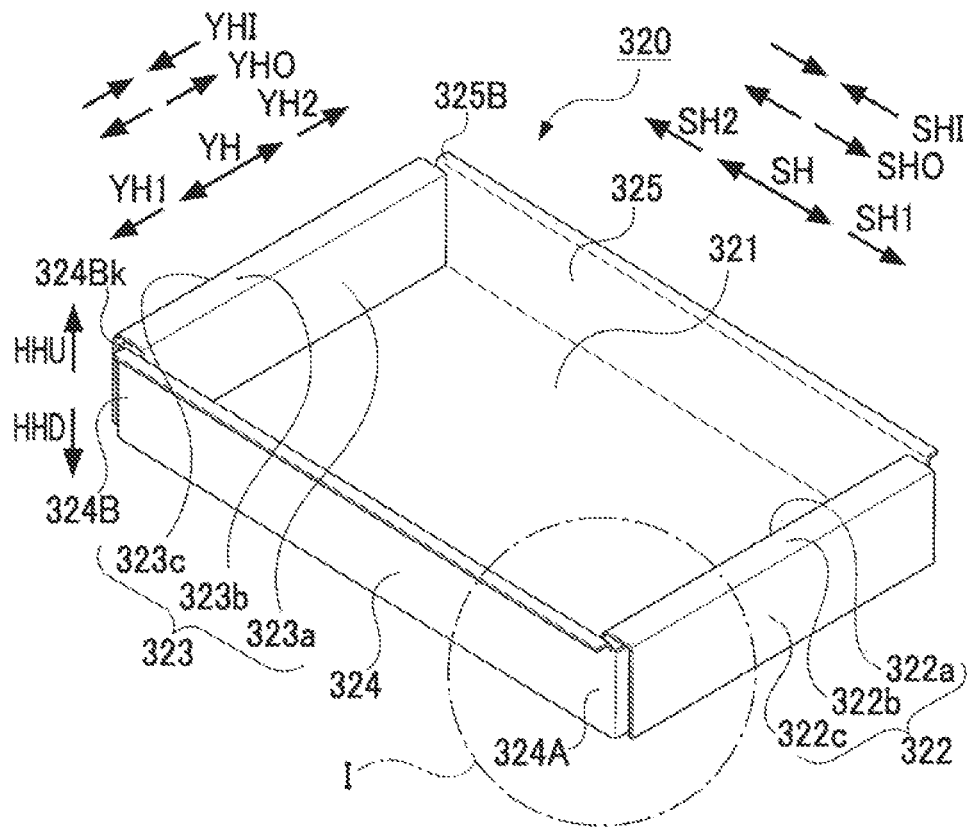
FIG. 18 is a perspective view of a metal case member used for the pack case according to the third modification.
Figure 19:
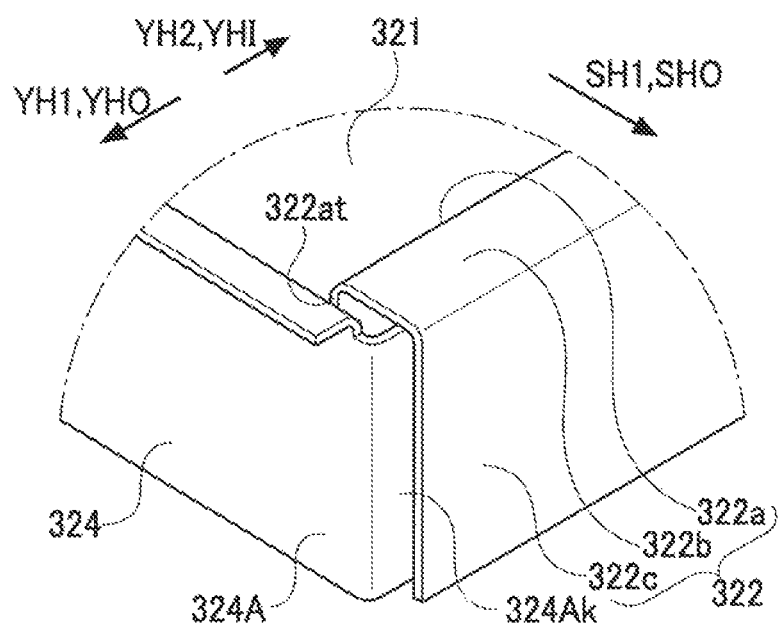
FIG. 19 is an enlarged perspective view of a corner (a part I in FIG. 18) of the metal case member used for the pack case according to the third modification.
Figure 20:
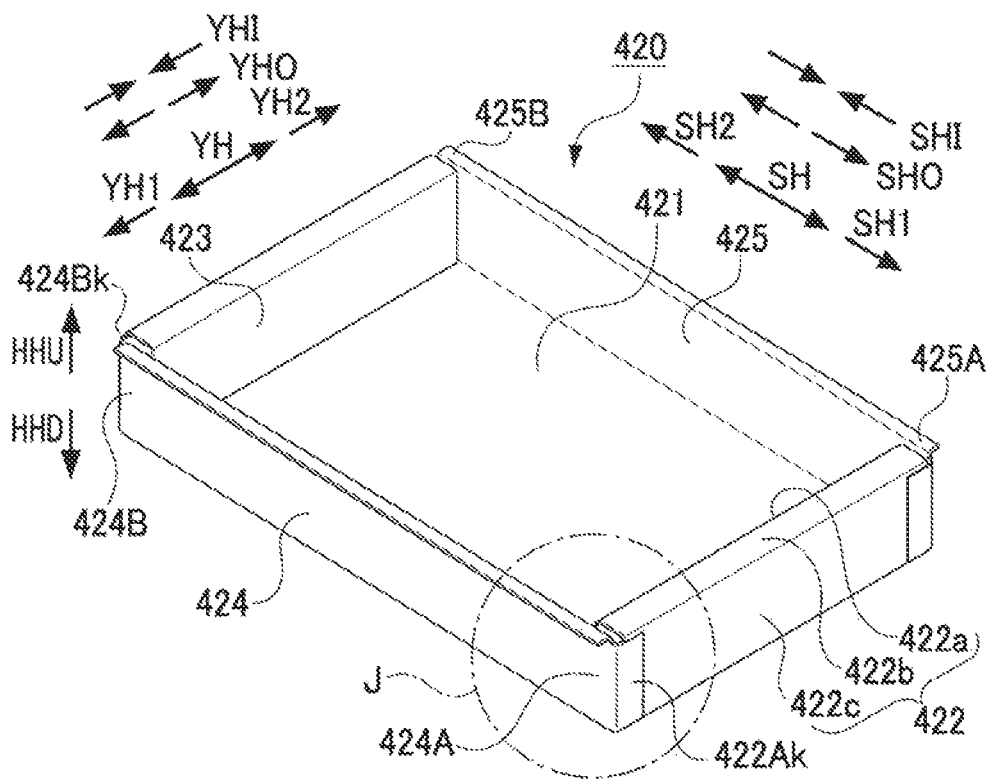
FIG. 20 is a perspective view of a metal case member used for the pack case according to the fourth modification.

In contrast, as can be easily understood from FIGS. 17 and 19, in the pack case 310 of the third modification, connection between first and second side walls 312, 313, and third and fourth side walls 314, 315 is improved.

Specifically, a third side wall metal plate portion 324 of the metal case member 320 has an extending portion 324A extending further outward SHO in the stacking direction SH (more toward the first side SH1 in the stacking direction SH, lower right side in FIGS. 17 and 19) than an inner metal plate portion 322a of the first side wall 312. The extending portion 324A has a panel engagement portion 324Ak that is located outward SHO of the inner metal plate portion 322a in the stacking direction SH (on the first side SH1 in the stacking direction SH) and inward YH1 of an edge 322at of the inner metal plate portion 322a in the lateral direction YH (on the second side YH2 in the lateral direction YH, upper right side in FIGS. 17 and 19) and that engages with the inner metal plate portion 322a via a corner connecting resin portion 336.

In the third modification, the panel engagement portion 324Ak is a bending protruding portion formed by bending an end of the extending portion 324A inward YH1 in the lateral direction YH (toward the second side YH2 in the lateral direction YH, upper right side in FIGS. 17 and 19) and protruding the end inward YH1 in the lateral direction YH (toward the second side YH2 in the lateral direction YH) between the inner metal plate portion 322a and an outer metal plate portion 322c.

Also in the metal case member 320 of the pack case 310 (see FIG. 18) according to the third modification, panel engagement portions are formed at the other three corners. That is, an extending portion 324B of the third side wall metal plate portion 324 is also provided with a panel engagement portion 324Bk that is a bending protruding portion similar to the panel engagement portion 324Ak. Also, extending portions 325A, 325B of the fourth side wall metal plate portion 325 are each provided with a panel engagement portion (not shown) formed of a bending protruding portion similar to the panel engagement portion 324Ak.

Thus, in the pack case 310 of the third modification, the panel engagement portion 324Ak etc. provided in the extending portions 324A, 324B, 325A, 325B of the third side wall metal plate portion 324 and the fourth side wall metal plate portion 325 are engaged with the inner metal plate portions 322a, 323a via the corner connecting resin portions 336. Thus, the third side wall 314 and the fourth side wall 315 including the third side wall metal plate portion 324 and the fourth side wall metal plate portion 325 can be more firmly connected with the first side wall 312 and the second side wall 313 that are the panel structure walls, which enables the pack case 310 to have higher rigidity and higher strength.

Fourth Modification

Next, the pack case 410 according to the fourth modification will be described with reference to FIGS. 20 to 23. The pack case 410 according to the fourth modification and a metal case member 420 included therein also have substantially the same appearances as the pack case 10 and the metal case member 20 (see FIGS. 2, 4 and 5) of the first embodiment.

However, in the pack case 10 of the first embodiment, the first side wall 12 and the second side wall 13 are connected with the third side wall 14 and the fourth side wall 15 at the four corners of the bottom wall 11 with only the corner connecting resin portions 36 made from resin.

Figure 21:
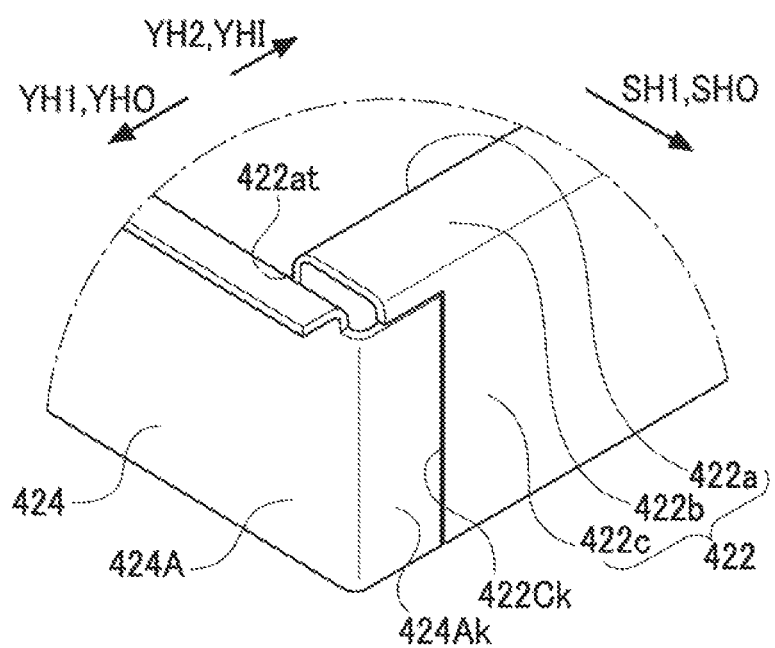
FIG. 21 is an enlarged perspective view of a corner (a part J in FIG. 20) of the metal case member used for the pack case according to the fourth modification.
Figure 22:
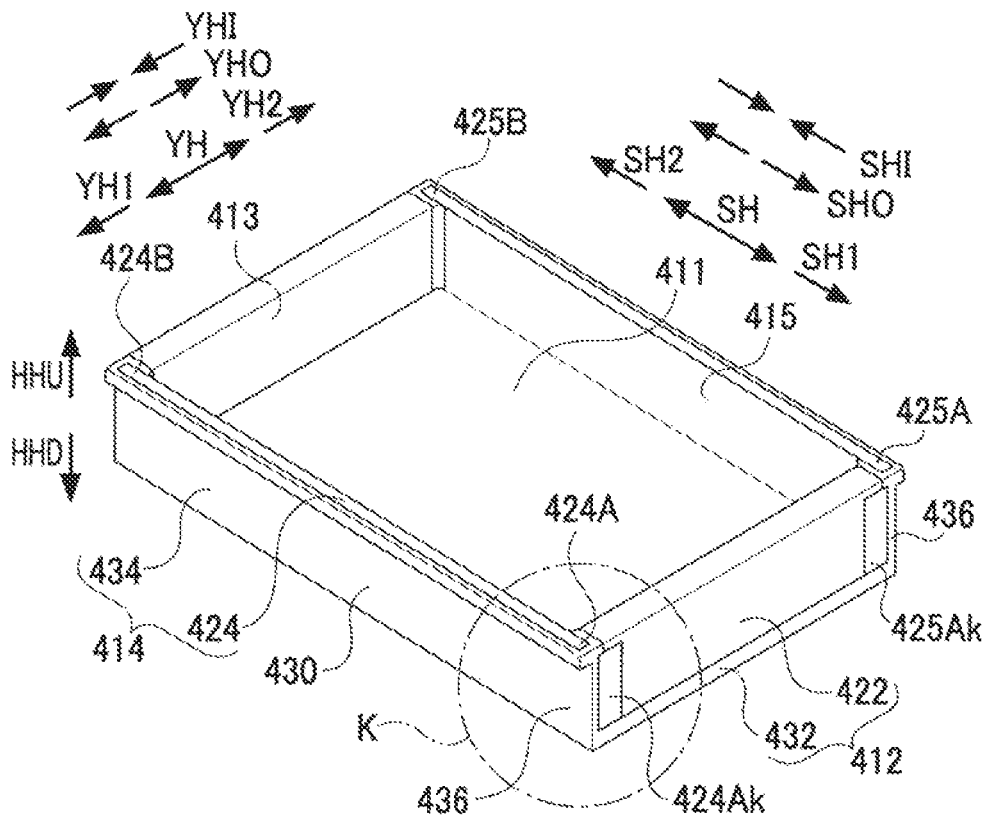
FIG. 22 is a perspective view of the pack case according to the fourth modification.
Figure 23:
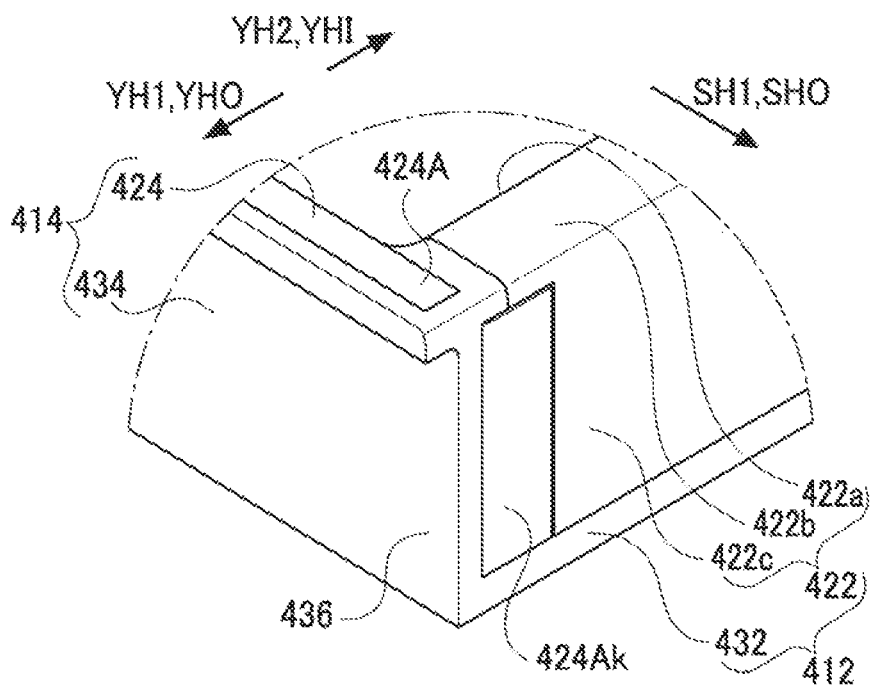
FIG. 23 is an enlarged perspective view of a corner (a part K in FIG. 22) of the pack case according to the fourth modification.

In contrast, as can be easily understood from FIGS. 21 and 23, in the pack case 410 of the fourth modification, connection between first and second side walls 412, 413, and third and fourth side walls 414, 415 is improved.

Specifically, a third side wall metal plate portion 424 of the metal case member 420 has an extending portion 424A extending further outward SHO in the stacking direction SH (more toward the first side SH1 in the stacking direction SH, lower right side in FIGS. 21 and 23) than an inner metal plate portion 422a of the first side wall 412. The extending portion 424A has a panel engagement portion 424Ak that is located outward SHO of the inner metal plate portion 422a in the stacking direction SH (on the first side SH1 in the stacking direction SH) and inward YH1 of an edge 422at of the inner metal plate portion 422a in the lateral direction YH (on the second side YH2 in the lateral direction YH, upper right side in FIGS. 21 and 23) and that engages with the inner metal plate portion 422a via a corner connecting resin portion 436.

In the fourth modification, the panel engagement portion 424Ak is a bending protruding portion formed by bending an end of the extending portion 424A to the second side YH2 in the lateral direction YH (inward YH1 in the lateral direction YH, upper right side in FIGS. 21 and 23) and protruding the end inward YH1 in the lateral direction YH (toward the second side YH2 in the lateral direction YH) at the same position in the stacking direction SH as an outer metal plate portion 422c. The outer metal plate portion 422c is provided with a notch 422Ck that can accommodate the panel engagement portion 424Ak.

In the metal case member 420 of the pack case 410 (see FIG. 20) according to the fourth modification, panel engagement portions are formed at the other three corners. That is, the extending portion 424B of the third side wall metal plate portion 424 is also provided with a panel engagement portion 424Bk that is a bending protruding portion similar to the panel engagement portion 424Ak. Also, extending portions 425A, 425B of the fourth side wall metal plate portion 425 are each provided with a panel engagement portion 425Ak etc. formed of a bending protruding portion similar to the panel engagement portion 424Ak etc.

Thus, in the pack case 410 of the fourth modification, panel engagement portion 424Ak etc. provided in the extending portions 424A, 424B, 425A, 425B of the third side wall metal plate portion 424 and the fourth side wall metal plate portion 425 are engaged with the inner metal plate portions 422a, 423a via the corner connecting resin portions 436. Thus, the third side wall 414 and the fourth side wall 415 including the third side wall metal plate portion 424 and the fourth side wall metal plate portion 425 can be more firmly connected with the first side wall 412 and the second side wall 413 that are the panel structure walls, which enables the pack case 410 to have higher rigidity and higher strength.

Second Embodiment

Figure 24:
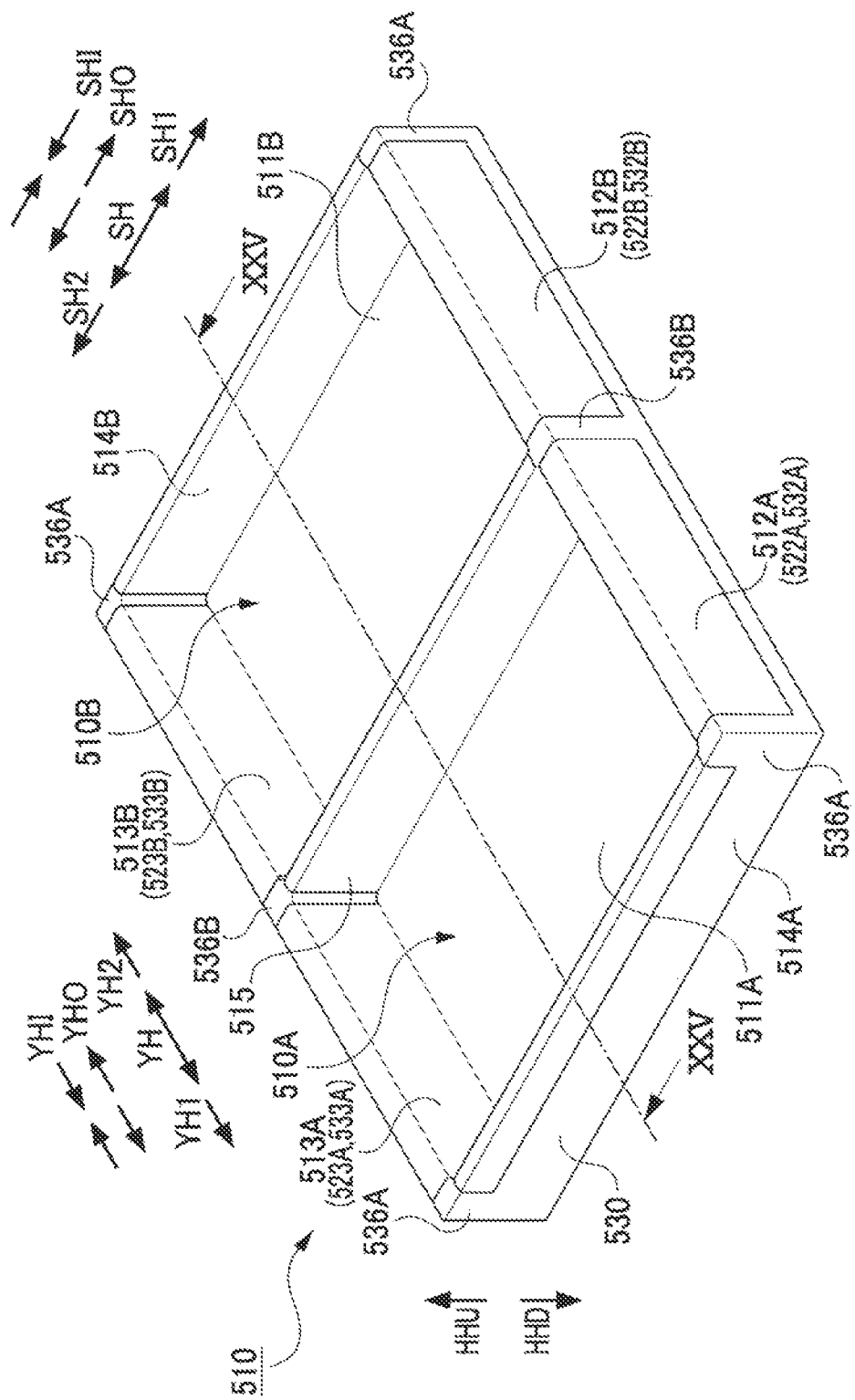
FIG. 24 is a perspective view of the pack case according to the second embodiment.
Figure 25:
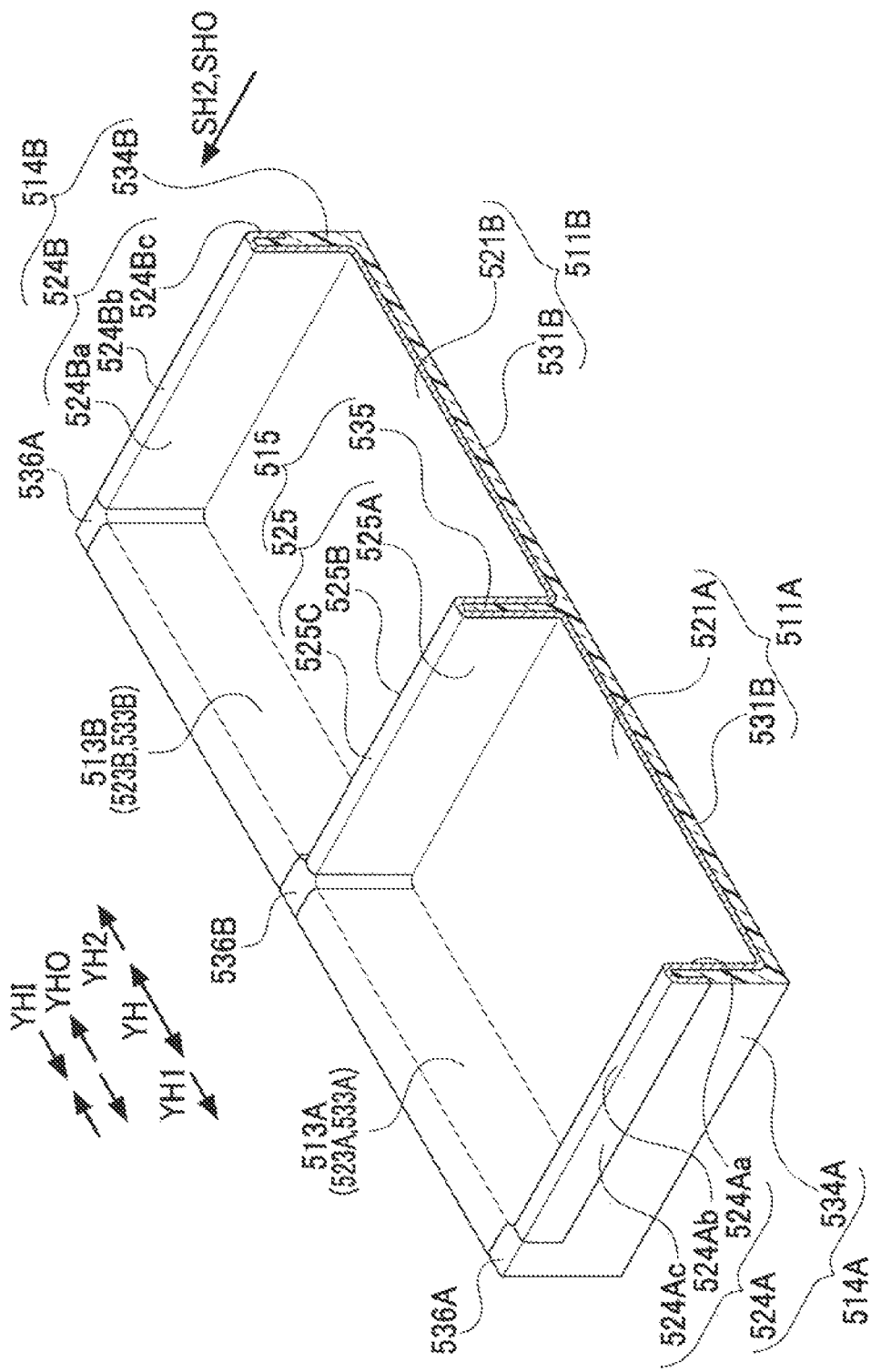
FIG. 25 is a sectional perspective view of the pack case according to the second embodiment, taken along line XXV-XXV in FIG. 24.

Next, the pack case 510 according to the second embodiment will be described with reference to FIGS. 24 to 26. Unlike the pack case 10 and the metal case member 20 (see FIGS. 2, 4 and 5) of the first embodiment, the pack case 510 and the metal case member 520 included in the pack case 510 according to the second embodiment have a pair of accommodating portions 510A, 510B such that two battery stacks 5 can be accommodated therein while being arranged side by side.

As can be understood from FIG. 26, a metal case member 520 is also formed by bending a flat metal plate, and includes a pair of bottom metal plate portions 521A, 521B, each having a rectangular plate shape, and side wall metal plate portions 522A, 522B, 523A, 523B, 524A, 524B, and 525 each having a rectangular shape and extending upright from four sides of the bottom metal plate portions 521A, 521B to the upper side HHU.

Among these, in the accommodating portion 510A, the first side wall metal plate portion 522A is located on the first side SH1 in the stacking direction SH (lower right side in FIG. 26), and the second side wall metal plate portion 523A is located on the second side SH2 in the stacking direction SH (upper left side in FIG. 26) and faces the first side wall metal plate portion 522A. The third side wall metal plate portion 524A and a fourth side wall metal plate portion 525A extend in the stacking direction SH so as to be orthogonal to the lateral direction YH and to face each other.

In the accommodating portion 510B, the first side wall metal plate portion 522B is located on the first side SH1 in the stacking direction SH (lower right side in FIG. 26), and the second side wall metal plate portion 523B is located on the second side SH2 in the stacking direction SH (upper left side in FIG. 26) and faces the first side wall metal plate portion 522B. The third side wall metal plate portion 524B and a fourth side wall metal plate portion 525B extend in the stacking direction SH so as to be orthogonal to the lateral direction YH and to face each other. However, in the metal case member 520 of the second embodiment, the fourth side wall metal plate portions 525A, 525B are shared by the accommodating portions 510A, 510B. Further, the side wall metal plate portions 522A to 524A, 525 arranged on the four sides are not directly connected to one another and are connected via the bottom metal plate portion 521A, and the side wall metal plate portions 522B to 524B, 525 arranged on the four sides are not directly connected to one another and are connected via the bottom metal plate portion 521B.

Here, since the first side wall metal plate portions 522A, 522B and the second side wall metal plate portions 523A, 523B are similar to the first side wall metal plate portion 22 and the second side wall metal plate portion 23 of the first embodiment (see FIGS. 4 and 5), description thereof will be omitted.

The third side wall metal plate portion 524A has, unlike the third side wall metal plate portion 24 of the first embodiment, an inner metal plate portion 524Aa bent from a bottom metal plate portion 521A and standing upright, an outer metal plate portion 524Ac located outward YHO of the inner metal plate portion 524Aa in the lateral direction YH (on the first side YH1 in the lateral direction YH) and facing the inner metal plate portion 524Aa, and a connecting portion 524Ab connecting the inner metal plate portion 524Aa and the outer metal plate portion 524Ac. Similarly, the third side wall metal plate portion 524B has an inner metal plate portion 524Ba bent from a bottom metal plate portion 521B and standing upright, an outer metal plate portion 524Bc located outward YHO of the inner metal plate portion 524Ba in the lateral direction YH (on the second side YH2 in the lateral direction YH) and facing the inner metal plate portion 524Ba, and a connecting portion 524Bb connecting the inner metal plate portion 524Ba and the outer metal plate portion 524Bc.

The third side wall 514A of the pack case 510 has a third side wall resin portion 534A interposed between and fixed to the inner metal plate portion 524Aa and the outer metal plate portion 524Ac and having a density lower than that of the metal forming the inner metal plate portion 524Aa and the outer metal plate portion 524Ac. Thus, the third side wall 514A is a panel structure lateral side wall having the sandwich panel structure. Similarly, the third side wall 514B has a third side wall resin portion 534B between the inner metal plate portion 524Ba and the outer metal plate portion 524Bc, and is the panel structure lateral side wall having the sandwich panel structure.

The fourth side wall metal plate portion 525 has, unlike the fourth side wall metal plate portion 25 of the first embodiment, the fourth side wall metal plate portion 525A bent from the bottom metal plate portion 521A and standing upright, the fourth side wall metal plate portion 525B located outward YHO of the fourth side wall metal plate portion 525A in the lateral direction YH (on the second side YH2 in the lateral direction YH) and facing the fourth side wall metal plate portion 525A while being bent from the bottom metal plate portion 521B and standing upright, and a connecting portion 525C connecting the fourth side wall metal plate portion 525A and the fourth side wall metal plate portion 525B.

The fourth side wall 515 of the pack case 510 has a fourth side wall resin portion 535 interposed between and fixed to the fourth side wall metal plate portion 525A and the fourth side wall metal plate portion 525B and having a density lower than that of the metal forming the fourth side wall metal plate portion 525A and the fourth side wall metal plate portion 525B. Thus, the fourth side wall 515 is the panel structure lateral side wall having the sandwich panel structure.

As described above, in the pack case 510, all the third side walls 514A, 514B and the fourth side wall 515 are the panel structure lateral side walls. Thus, compared to the case using, instead of the third side walls 514A, 514B and the fourth side wall 515, only the inner metal plate portions 524Aa, 524Ba, 525Aa each formed of a single metal plate, or using only the inner metal plate portions 524Aa, 524Ba, 525Aa, the third side wall resin portions 534A, 534B, and the fourth side wall resin portion 535, the third side wall 514A, 514B and the fourth side wall 515 have higher flexural rigidity and torsional rigidity. Therefore, the rigidity and the strength of the pack case 510 can be further improved. In particular, in the pack case 510 of the second embodiment, both the third side wall 514A and the fourth side wall 515, and both the third side wall 514B and the fourth side wall 515 are the panel structure lateral side walls having the sandwich panel structure. Therefore, it is possible to provide the pack case 510 that is lightweight but has even higher rigidity.

In the pack case 510 of the second embodiment, as in the pack case 10 of the first embodiment, the first side walls 512A, 512B and the second side walls 513A, 513B are also the panel structure walls having the sandwich panel structure. Therefore, it is possible to provide the pack case 510 that is lightweight but has even higher rigidity.

In the above, description has been made with the first and second embodiments and the first to fourth modifications. However, needless to say, the present disclosure is not limited to the embodiments and the like, and may be appropriately changed for application without departing from the scope of the present disclosure. For example, the first and second embodiments and the first to fourth modifications describe the pack case 10 and the like, in which the metal case member 20 and the like are each formed by bending the single metal plate 20M or the like. However, the present disclosure is not limited to this, and the metal case member constituting the pack case 10 and the like may be formed of a plurality of metal plates.

In the second to fourth modifications, the extending portions 224A, 324A, 424A, etc. of the third side wall metal plate portions 224, 324, 424, etc. are provided with the panel engagement portions 224Ak, 324Ak, 424Ak, etc., and the third side wall metal plate portions 224, 324, 424, etc. themselves do not have the sandwich panel structure. However, the third side wall 214 etc. may be the panel structure lateral side wall having the sandwich panel structure, with the panel engagement portion 224Ak provided in the extending portion 224A etc. of the third side wall metal plate portion 224 etc. Thereby, it is possible to provide a pack case with even higher rigidity and strength.

The first and second embodiments and the first to fourth modifications show examples in which the first side wall 12 etc. and the second side wall 13 etc. have the inner metal plate portion 22*a* etc. and the outer metal plate portion 22*c* etc. with the same dimension in the height direction HH and have the sandwich panel structure over the entire length along the height direction HH. However, for example, in the pack case 510 of the second embodiment, the outer metal plate portions may have a dimension in the height direction 111 shorter than that of the inner metal plate portions, as in the third side walls S14A, S14B, so that each of the first side wall and the second side wall has the sandwich panel structure only at a part thereof in the height direction. Moreover, each of the third side wall and the fourth side wall may have the sandwich panel structure only at a part thereof in the height direction.

What is claimed is:

1. A pack case that accommodates a battery stack in which a plurality of batteries are stacked in a stacking direction, the pack case compresses and restrains the battery stack in the stacking direction, the pack case comprising:
   a first wall located on a first side of the accommodated battery stack in the stacking direction, the first wall contacts a first end of the battery stack and presses the battery stack toward a second side in the stacking direction; and
   a second wall located on the second side of the accommodated battery stack in the stacking direction, the second wall contacts a second end of the battery stack and presses the battery stack toward the first side in the stacking direction, wherein
   at least one of the first wall and the second wall is a panel structure wall including a first metal plate, a second metal plate, and an interposed member,
   the second metal plate is located outward of the first metal plate in the stacking direction and faces the first metal plate, and
   the interposed member is interposed between the first metal plate and the second metal plate, the interposed member is fixed to the first metal plate and the second metal plate, and the interposed member has a density lower than a density of a metal of the first metal plate and the second metal plate; wherein
   the panel structure wall is an one metal plate bended in a U-shape,
   the panel structure wall includes a first metal plate portion that is the first metal plate, a second metal plate portion that is the second metal plate, and a connecting portion connecting the first metal plate portion and the second metal plate portion;
   the pack case further comprising:
   a third wall and a fourth wall each located on an outer side of the accommodated battery stack in a lateral direction orthogonal to the stacking direction, the third wall and the fourth wall connecting the first wall and the second wall, and the first wall, the second wall, the third wall and the fourth wall forming a rectangular frame surrounding the battery stack from four sides wherein
   the third wall and the fourth wall each include a lateral metal plate extending in the stacking direction, and the lateral metal plate is connected to the first metal plate and the second metal plate via a corner connecting resin portion made from resin.

2. The pack case according to claim 1, wherein
   the lateral metal plate has an extending portion extending outward of the first metal plate of the panel structure wall in the stacking direction, the panel structure wall being the first wall or the second wall, and
   the extending portion includes a panel engagement portion that is located outward of the first metal plate in the stacking direction and inward of a lateral edge of the first metal plate in the lateral direction, and
   the extending portion engages with the first metal plate via the corner connecting resin portion.

3. The pack case according to claim 1, wherein
   at least one of the third wall and the fourth wall is a panel structure lateral side wall including the lateral metal plate, a second lateral metal plate, and a lateral interposed member,
   the second lateral metal plate extends in the stacking direction and is located outward or inward of the lateral metal plate in the lateral direction so as to face the lateral metal plate, and
   the lateral interposed member is interposed between the lateral metal plate and the second lateral metal plate, the lateral interposed member is fixed to the lateral metal plate and the second lateral metal plate, and the lateral interposed member has a density lower than a density of a metal of the lateral metal plate and the second lateral metal plate.

4. The pack case according to claim 3, wherein each of the third wall and the fourth wall is the panel structure lateral side wall.

5. The pack case according to claim 1, wherein each of the first wall and the second wall is the panel structure wall.

6. A battery pack comprising:
   a battery stack in which a plurality of batteries are stacked in a stacking direction; and a pack case that accommodates the battery stack and compresses and restrains the battery stack in the stacking direction, the pack case including
- a first wall located on a first side of the accommodated battery stack in the stacking direction, the first wall contacts a first end of the battery stack and presses the battery stack toward a second side in the stacking direction, and
- a second wall located on the second side of the accommodated battery stack in the stacking direction, the second wall contacts a second end of the battery stack and presses the battery stack toward the first side in the stacking direction, wherein at least one of the first wall and the second wall is a panel structure wall including a first metal plate, a second metal plate, and an interposed member, the second metal plate is located outward of the first metal plate in the stacking direction and faces the first metal plate, and the interposed member is interposed between the first metal plate and the second metal plate, the interposed member is fixed to the first metal plate and the second metal plate, and the interposed member has a density lower than a density of a metal of the first metal plate and the second metal plate; wherein the panel structure wall is an one metal plate bended in a U-shape, the panel structure wall includes a first metal plate portion that is the first metal plate, a second metal plate portion that is the second metal plate, and a connecting portion connecting the first metal plate portion and the second metal plate portion;

the pack case further comprising:

a third wall and a fourth wall each located on an outer side of the accommodated battery stack in a lateral direction orthogonal to the stacking direction, the third wall and the fourth wall connecting the first wall and the second wall, and the first wall, the second wall, the third wall and the fourth wall forming a rectangular frame surrounding the battery stack from four sides wherein the third wall and the fourth wall each include a lateral metal plate extending in the stacking direction, and the lateral metal plate is connected to the first metal plate and the second metal plate via a corner connecting resin portion made from resin.

* * * * *